US009451455B2

(12) United States Patent
Cormier et al.

(10) Patent No.: US 9,451,455 B2
(45) Date of Patent: Sep. 20, 2016

(54) ENABLING MULTIPLE AUTHENTICATION APPLICATIONS

(71) Applicant: Research In Motion Limited, Waterloo (CA)

(72) Inventors: Jean-Philippe Paul Cormier, Ottawa (CA); Johanna Lisa Dwyer, Brookline, MA (US)

(73) Assignee: BlackBerry Limited, Waterloo, ON (CA)

( * ) Notice: Subject to any disclaimer, the term of this patent is extended or adjusted under 35 U.S.C. 154(b) by 189 days.

(21) Appl. No.: 13/723,454

(22) Filed: Dec. 21, 2012

(65) Prior Publication Data

US 2013/0331063 A1    Dec. 12, 2013

Related U.S. Application Data

(60) Provisional application No. 61/658,172, filed on Jun. 11, 2012.

(51) Int. Cl.
    *H04M 1/66*      (2006.01)
    *H04W 12/06*      (2009.01)
    *H04L 29/06*      (2006.01)

(52) U.S. Cl.
    CPC .......... *H04W 12/06* (2013.01); *H04L 63/0272* (2013.01); *H04L 63/0853* (2013.01)

(58) Field of Classification Search
    CPC ... H04W 12/06; H04W 12/12; H04W 12/08; H04W 8/245; H04W 88/14; H04W 88/02; H04W 84/02; H04W 8/183; H04W 8/12; H04W 60/00; H04W 4/16; H04W 64/00; H04W 68/00; H04W 84/025; H04W 84/12; H04L 63/08; H04L 29/06; H04L 41/0213; H04L 29/08072; H04L 45/00; H04L 41/12; H04Q 3/005; H04B 1/3816; H04H 60/33; G06K 19/0723; G08B 3/1016; G06Q 10/10; H04M 11/06; G06F 9/4411

USPC .......... 455/411, 419, 560, 422.1, 461, 550.1, 455/403, 557, 558, 410, 432.1, 433, 435, 455/517, 445, 456.6, 458, 41.1; 340/825.44, 825.47, 7.21, 7.24; 709/41.1, 204, 225, 223, 227, 229, 709/218; 710/104; 370/389, 254, 338; 379/93.02; 726/3

See application file for complete search history.

(56) References Cited

U.S. PATENT DOCUMENTS

| 6,463,473 | B1 * | 10/2002 | Gubbi | ........................ 709/225 |
| 6,556,820 | B1 * | 4/2003 | Le et al. | ....................... 455/411 |
| 2011/0212707 | A1 * | 9/2011 | Mahalal | ....................... 455/411 |
| 2012/0210397 | A1 * | 8/2012 | Suh et al. | ........................ 726/3 |

(Continued)

FOREIGN PATENT DOCUMENTS

| EP | 1059822 | 12/2000 |
| EP | 2448301 | 5/2012 |
| WO | 00/36869 | 6/2000 |

OTHER PUBLICATIONS

Extended European Search Report issued in EP Application No. 12199262.2 on May 2, 2013; 9 pages.

(Continued)

*Primary Examiner* — Charles Appiah
*Assistant Examiner* — Alexander Yi
(74) *Attorney, Agent, or Firm* — Fish & Richardson P.C.

(57) ABSTRACT

In some implementations, a method includes receiving, by user equipment (UE), an authentication request from a public land mobile network (PLMN). The request identifies an authentication application. The authentication application is executed to determine an authentication response based on the request. The authentication response is transmitted to the PLMN.

16 Claims, 21 Drawing Sheets

(56) References Cited

U.S. PATENT DOCUMENTS

2012/0322412 A1* 12/2012 Qiang ............................ 455/411
2013/0078916 A1* 3/2013 Glickman .................... 455/41.1

OTHER PUBLICATIONS

ETSI TS 101 220 V11.0.0; Smart Cards; ETSI Numbering System for Telecommunication Application Providers (Release 11) Jun. 2011; 36 pages.

ETSI TS 122 011 V8.10.0; Technical Specification; Digital Cellular Telecommunications System (Phase 2+); Universal Mobile Telecommunications System (UMTS); LTE; Service Accessibility; Jan. 2012; 28 pages.

3GPP TS 31.102 V6.5.0; 3rd Generation Partnership Project; Technical Specification Group Terminals; Characteristics of the USIM Application (Release 6); Mar. 2004; 154 pages.

* cited by examiner

ENABLING MULTIPLE AUTHENTICATION APPLICATIONS

CLAIM OF PRIORITY

This application claims priority under 35 USC §119(e) to U.S. Patent Application Ser. No. 61/658,172, filed on Jun. 11, 2012, the entire contents of which are hereby incorporated by reference.

TECHNICAL FIELD

This invention relates to enabling multiple authentication applications.

BACKGROUND

3rd Generation Partnership Project (3GPP) networks include Universal Mobile Telecommunications Systems (UMTSs) having UMTS-based radio access networks (RANs), which are referred to as UTRANs. In current 3rd 3GPP networks, authentication of a user is accomplished by the UTRAN Subscriber Identity Module (USIM) and the Home Location Register (HLR). The HLR generates a set of challenges, and the USIM generates responses using a shared secret and authentication algorithm. In general, the USIM is a network access application that resides in a Universal Integrated Circuit Card (UICC) and includes files and applications. When the Mobile Equipment (ME) receives an AUTHENTICATE REQUEST from the network, the ME transfers that request to the USIM using the AUTHENTICATE COMMAND. The USIM computes the response values and provides them to the ME. The ME then transmits the AUTHENTICATION RESPONSE to the network to complete the authentication procedure. Currently, the USIM is personalized with a single shared secret (e.g., a symmetric key shared with the HLR) and a single authentication algorithm to compute the authentication responses. The USIM manufacturer, who is trusted by the network operator (the owner of both the HLR and the USIM), personalizes the USIM.

DESCRIPTION OF DRAWINGS

For a more complete understanding of this disclosure, reference is now made to the following brief description, taken in connection with the accompanying drawings and detailed description, wherein like reference numerals represent like parts.

Like reference symbols in the various drawings indicate like elements.

DETAILED DESCRIPTION

Figure 1:
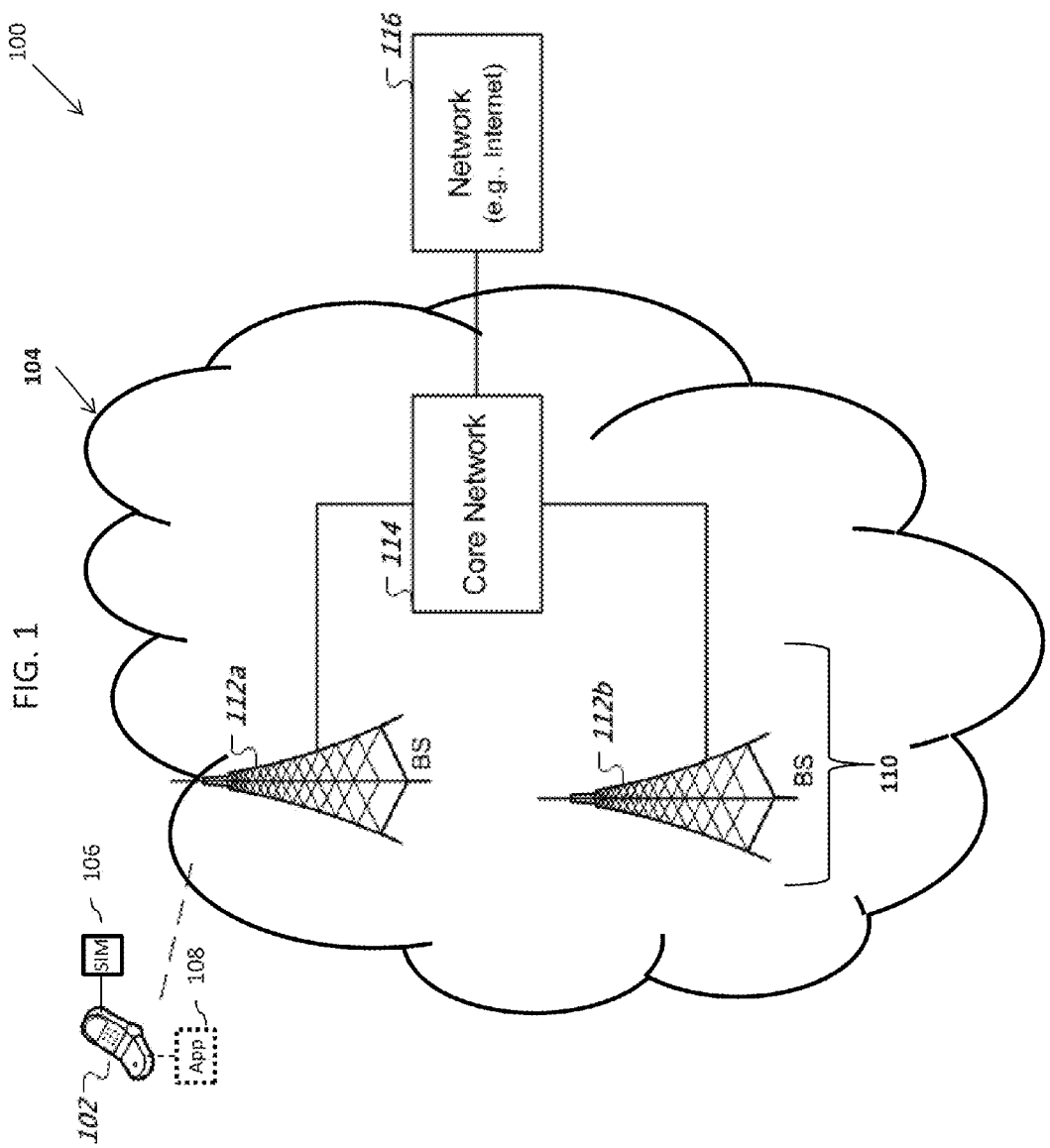
FIG. 1 is a schematic representation of a public land mobile network (PLMN)

The present disclosure is directed to systems and methods for enabling multiple authentication applications. For example, user equipment (UE) may receive, from a public land mobile network (PLMN), an authentication request identifying an authentication application and execute the identified authentication application to generate an authentication response parameter (RES). In some implementations, the identified authentication application may be different from a legacy SIM authentication application. In the present disclosure, the term "SIM" is used to cover UTRAN subscriber identity module (USIM), a universal integrated circuit card (UICC), an embedded UICC (eUICC), or other smart card configured to execute a legacy authentication application. In general, the authentication request includes authentication parameters such as a random number (RAND), and the authentication application generates the RES using the RAND and an authentication algorithm known to the PLMN. The PLMN determines whether the computed RAND matches an expected authentication response parameter (XRES). As an option, the authentication application may determine whether the computed RAND matches an expected authentication request parameter (AUTN). If the two values match, the UE is authenticated with the PLMN. In regards to accessing a visited public land mobile network (VPLMN), a Closed Subscriber Group (CSG) cannot give a CSG owner the capability to permit a user to access the CSG even if there is no roaming agreement between the user's home public land mobile network (HPLMN) and the VPLMN that the CSG is associated with. In regards to wholesale roaming, Operator A who cannot get in to a bilateral roaming agreement with Operator B for technical reasons (operating a network on an uncommon BAND or operating using an uncommon radio technology) would use wholesale roaming to enable global roaming for their customers. Operator A would purchase wholesale service from Operator C who has a bilateral roaming agreement with Operator B. Operator A would then enable Operator C's IMSIs in their USIMs when their customers are roaming to enable a seamless roaming experience.

In some implementations, the authentication application, as compared with the legacy SIM authentication application, may be stored in memory of the ME or installed in the SIM. In the memory-stored implementation, the PLMN may transmit an authentication request identifying an authentication application stored in the ME memory. In other words, the request may indicate that the authentication computation be executed using a particular authentication application installed in the memory of the ME rather than the authentication application installed in the SIM. For example, the authentication request may include an application identifier (ID) to identify the memory-stored authentication application. In these instances, the UE may locate the appropriate authentication application installed locally using the received application ID and execute the authentication application. The identified authentication application generates the authentication response using the authentication parameters included in the authentication request. The interaction between the ME and the identified authentication application may be done using native Application Program Interfaces (APIs), java APIs, an AT command interface, or other interfaces. The remaining steps in the authentication procedure may remain unchanged as compared with the authentication process executed by a legacy SIM authentication application. If the PLMN does not identify a specific authentication application, the UE may execute the legacy SIM authentication application to maintain backwards compatibility.

Depending on the configuration of a Visiting PLMN (VPLMN) and roaming agreements between the VPLMN and the Home PLMN (HPLMN), the UE may not be able to register at all or incur some extra roaming charges. In some implementations, prior to receiving an authentication request, the UE may transmit information to the VPLMN indicating a capability for executing CSG authentication procedure. For example, the UE may transmits a list of the authentication application IDs identifying installed authentication applications to the VPLMN. The authentication IDs may indicate that the UE has the security keys and identity information to authenticate directly with the VPLMN. In some instances, the UE may transmit a single application ID that includes or otherwise identifies a mobile country code (MCC) and a mobile network code (MNC) assigned to the VPLMN.

In the SIM-stored implementation, the UE may operate substantially similar to the memory implementation discussed above and the UE-to-SIM interface may be extended to identify the authentication application to use for the authentication computation. For example, the SIM may select the authentication application based on an identifier received from the ME. After the authentication computation, the remaining steps in the authentication procedure can, in some implementations, remain unchanged. This type of solution may be beneficial for wholesale roaming network providers. The first network provider may accomplish a wholesale solution by including two authentication applications in their SIMs rather than a single authentication application. In these instances, the SIM includes a first network provider's algorithms and keys and a second network provider's algorithms and keys. In other words, the SIM may contain two SIM authentication applications: a first-network-provider USIM; and a second-network-provider USIM. In this case, the network may specifically identify, using an application identifier (ID), to the SIM the authentication application to use for the authentication computation. In the case that the SIM is an Embedded Universal Integrated Circuit Card (eUICC), the eUICC may execute the appropriate authentication algorithm for the Network Access Application (NAA) of the enabled profile when an AUTHENTICATE command is received from the ME. In these instances, the NAA may provide the eUICC with the authentication application or at least an identification of the authentication application to execute and the appropriate parameters for the authentication computation. The eUICC may send the AUTHENTICATE command along with the configuration parameters to the authentication application identified by the NAA and provide the response to the ME. The ME may then transmit the AUTHENTICATION response to the network.

In some implementations, the authentication application may only provide temporary access to a network. For example, the user may tap or otherwise communicate to a Near Field Communication (NFC) smart poster or other device to download and install an authentication application. During a specified period of time or a specified number of uses, the downloaded authentication application may be used to authenticate a UE instead of, for example, the legacy SIM authentication application. In response to a timer expiring or the use numbers exceeding a specified threshold, the UE may uninstall or otherwise discard the downloaded authentication application and switch to the legacy SIM authentication application. For example, the downloaded authentication application may be used once, and after the authentication computation, the UE may delete or otherwise discard the application as the application will no longer successfully compute the authentication response parameters. In some implementations, the memory-stored or SIM-stored authentication applications may be temporary and be identified by an application ID as described above. Alternatively, the UE may automatically use the new authentication application in response to an authentication request without receiving an application ID. In other words, the new authentication application may take precedence over the legacy SIM authentication application for a specified number of uses or for a specified period of time or a user configuration. This approach may not include an application ID for the temporary authentication application.

In some implementations, the authentication application may be installed in an NFC reader, smart poster, a server or other device and not be installed in the SIM or the ME. Regardless, the authentication procedure may execute substantially similar steps to the memory-stored and SIM-stored implementations. For example, the PLMN requesting authentication may indicate the authentication application to execute the authentication computation. For example, the authentication request may include an application ID, a flag indicating that the network uses third-party authentication, or other information. Based on the indicator, the ME may determine that the authentication application is not resident in the ME memory or SIM. In response, the ME may notify, using, for example, an icon or popup, the user to communicate with separate device. The ME may transmit, to the separate device, the authentication parameters, and the separate device may compute (or some backend server connected to the device or the HLR connected to the device) the authentication response parameters. The ME may then transmit the authentication response to the PLMN to complete the authentication procedure. In some implementations, the ME may transmit information to the PLMN indicating a capability for executing the third-party authentication application procedure. Additionally, the PLMN may indicate a preference for the third party authentication, which may enable the ME to notify the user that additional actions may be requested. In some implementations, devices other than a NFC reader or smart poster may execute the authentication computation such as a USB dongle or security dongle.

By using multiple authentication applications, the user and the PLMN (e.g., VPLMN) may have greater flexibility by increasing access to PLMNs beyond what is allowed by the HPLMN. In other words, the user may not be locked out of certain networks. In addition, multiple authentication applications may include only small changes to PLMNs and associated specifications while maintaining one SIM. With this flexible authentication scheme, "multiSIM devices" currently on the market may be eliminated with a simple application installation. Since the user has a globally unique ID (IMSI), the PLMNs may only need to provision that IMSI on their HLR/HSS. If the issuer (e.g., network operator, enterprise administrator) wants to remove access for a particular user, the administrator may simply revoke the keys (and IMSI) for the authentication application, which may force the user back to normal home network or HPLMN controlled authentication. The disposable aspects of an authentication application may also be useful for users temporary entering an area such as an airline lounge. For example, the user may tap an NFC poster, download an authentication application, authenticate the UE, access the local network for a short period of time (e.g., hour), and leave. The authentication application may automatically disable/uninstall, and the UE may resume normal home network or HPLMN controlled authentication. In addition, the authentication applications may notify the user of additional user actions such as tapping a NFC reader, requesting the user to enter a PIN or security number, or others.

Figure 2:
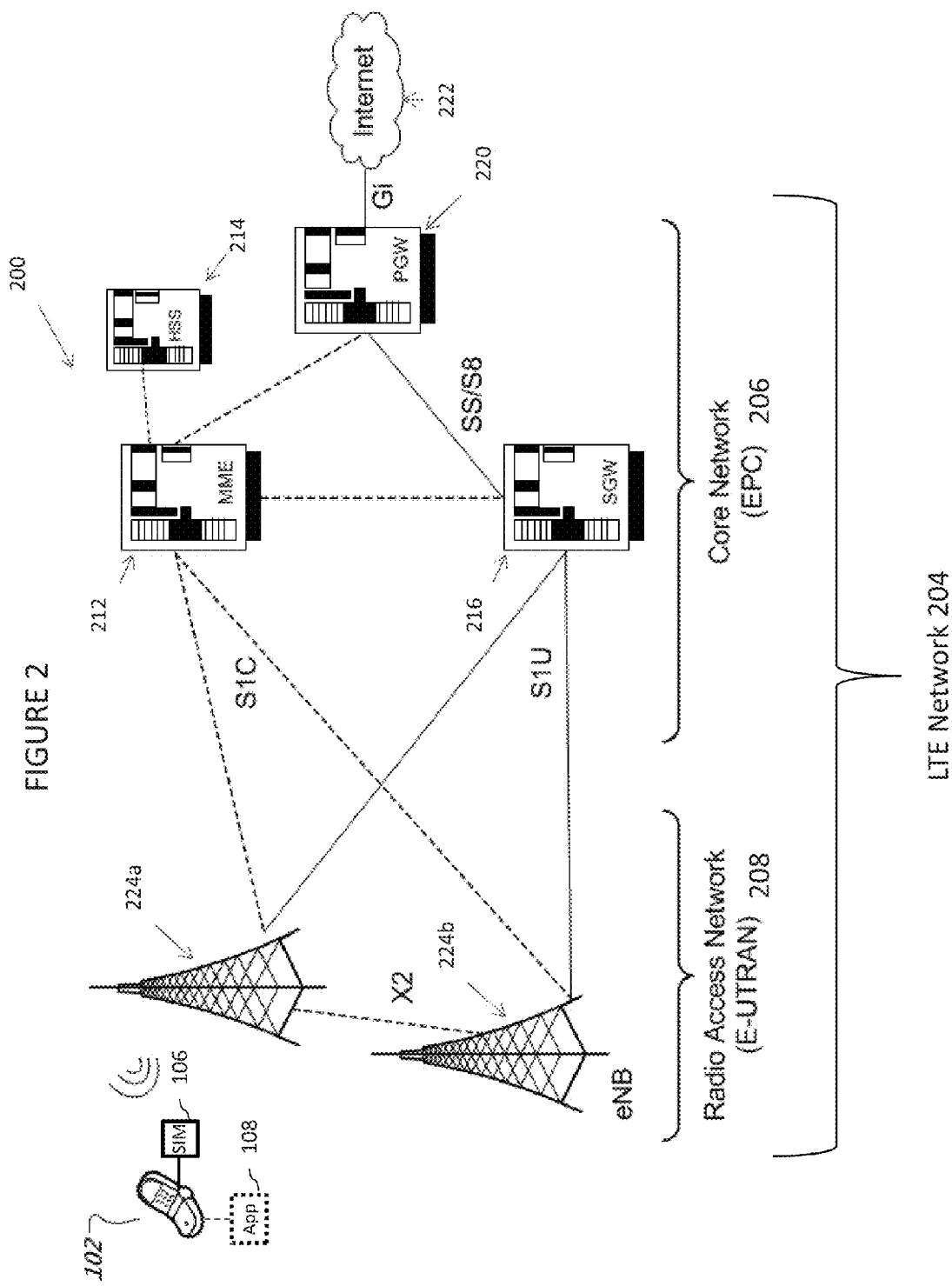
FIG. 2 is a schematic representation of a long term evolution (LTE) wireless cellular communication system.
Figure 3:
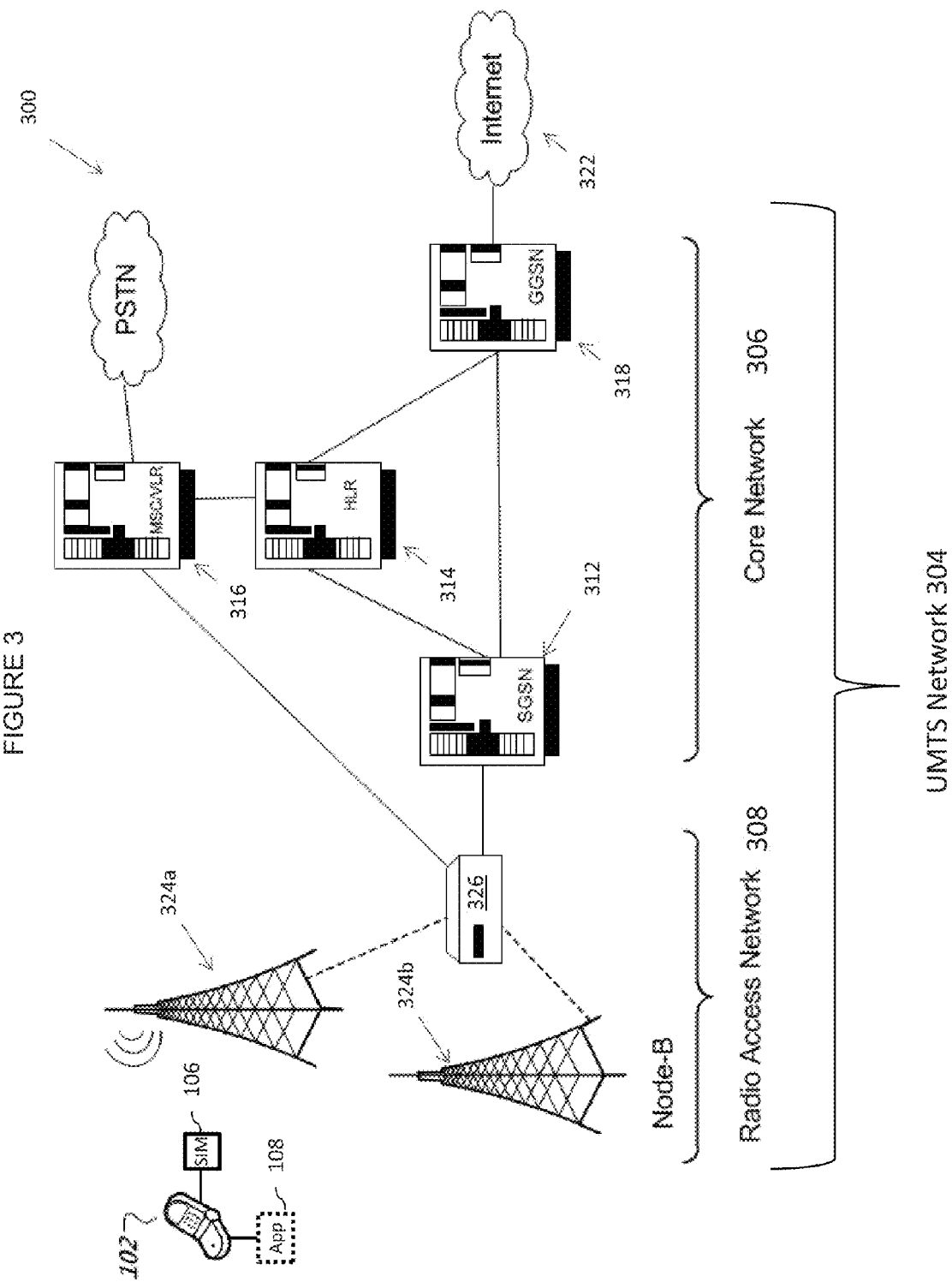
FIG. 3 is a schematic representation of a Universal Mobile Telecommunications System (UMTS) wireless cellular communication system.

FIGS. 1-3 illustrate example wireless communication systems 100-300, respectively, for identifying authentication applications. In particular, the wireless communication system 100 in FIG. 1 illustrates a generic wireless technology enabling multiple authentication applications. As for FIGS. 2 and 3, the wireless communication systems 200 and 300 illustrate particular wireless technology enabling multiple authentication applications. In particular, the wireless communication system 200 comprises a Long Term Evolution (LTE) wireless cellular communication system that enable multiple authentication applications, and the wireless communication system 300 comprises a Universal Mobile Telecommunications System (UMTS) wireless cellular communication system that enables multiple authentication applications.

Referring to FIG. 1, the wireless communication system 100 is configured to enable multiple authentication applications in accordance with one or more implementations of the present disclosure. For example, the system 100 may identify, to user equipment (UE) 102, an authentication application and associated authentication parameters for an authentication computation. As for a high-level description, the system 100 includes the UE 102 communicably coupled to a public land mobile network (PLMN) 104. In the illustrated implementation, the UE 102 includes or is otherwise associated with a SIM 106 for executing a legacy authentication application and an authentication application 108 for authenticating the UE 102 with the PLMN 104. The PLMN 104 includes a radio access network (RAN) 110 for wirelessly communicating with the UE 102 and a core network 114 for providing services to the UE 102. The RAN 106 includes base stations (BSs) 112a and 112b, and the core network 114 is communicably coupled to the UE 102 through the base station 112a or 112b. As for a high-level description of operation, prior to the core network 114 providing services to the UE 102, the PLMN 104 executes an authentication process with the UE 102. In particular, the PLMN 104 may transmit, to the UE 102, an authentication request including information identifying the authentication application 108. For example, the authentication request may include an application identifier (ID) for the authentication application. Based on the application ID, the UE 102 may execute the authentication application 104, as opposed to the legacy authentication application in the SIM 106, to generate a response to the authentication request. In some implementations, the authentication application 104 may execute an authentication computation based on authentication parameters included in the authentication request (e.g., random number), a shared secret, and an authentication algorithm. The UE 102 transmits an authentication response based on the authentication computation to the PLMN 104.

The UE 102 comprises an electronic device operable to receive and transmit wireless communication with the system 100. As used in this disclosure, the UE 102 is intended to encompass cellular phones, data phones, portable computers, smart phones, personal data assistants (PDAs), one or more processors within these or other devices, or any other suitable processing devices capable of communicating information over a wireless link with the PLMN 104. In some implementations, the UE 102 can wireless communicate in multiple bands such as, for example, in a cellular band and unlicensed band. Generally, the UE 102 may transmit voice, video, multimedia, text, web content, or any other user/client-specific content. In the illustrated implementation, the UE 102 is configured to receive an authentication request, determine whether the authentication request is for the SIM 106 or the authentication application 108, and pass the authentication request and the authentication parameters to the SIM 106 or the authentication application 108. In some implementations, the UE 102 receives the authentication response directly from the SIM 106 or the authentication application 108 and transmits the authentication response to PLMN 104. In some implementations, the UE 102 receives the results of the authentication computation executed by the SIM 106 or authentication application 108, generates the authentication response based on the results, and transmits the UE-generated authentication response to the PLMN 104.

In general, the SIM 106 can include any software, hardware, firmware, or combination thereof configured to access services associated with a home PLMN (HPLMN). For example, the SIM 106 may execute an authentication process with the HPLMN using a legacy authentication application stored in the SIM 106 and, after authentication, access subscribed services from the HPLMN. For example, the SIM 106 may be an integrated circuit that securely stores an international mobile subscriber identity (IMSI) used to identify the subscriber and a related key used to authenticate the subscriber with the HPLMN. In some implementations, the SIM 106 stores or identifies one or more of the following: a unique serial number (ICCID); an IMSI; a legacy authentication application; security authentication and ciphering information; temporary information related to the local network; a list of subscribed services the user; personal identification number (PIN); a personal unblocking code (PUK) for PIN unlocking; or other information. As previously mentioned, the term "SIM" is used to cover UTRAN subscriber identity module (USIM), a universal integrated circuit card (UICC), an embedded UICC (eUICC), or other smart card configured to execute a legacy authentication computation. For example, the SIM 106 may receive authentication parameters such as a random number (RAND) from a PLMN (e.g., HPLMN, VPLMN associated with the HPLMN) and execute the legacy authentication application to generate an authentication response. In these instances, the SIM 106 may generate the response using a private key shared with the HPLMN (or associated VPLMN) and an authentication algorithm known to the HPLMN.

In addition, the UE 102 is configured to execute an authentication application 108 for authenticating the UE 102 with the PLMN 104. For example, the authentication application 108 may receive an authentication request or authentication parameters from the UE 102 and execute an authentication computation based on the authentication request or authentication parameters. In short, the authentication application 108 can be implemented using any software, hardware, firmware, or a configuration of thereof to execute an authentication computation in response to an authentication request from the PLMN 104. For example, the authentication application 108 may identify authentication parameters (e.g., random number) based on an authentication request and execute the authentication computation based on the random number, a shared secret (e.g., private key), and an authentication algorithm. In some implementation, the authentication application 108 may directly generate the authentication response or compute a value such that the UE 102 generates the authentication response. While illustrated as separate elements, the SIM 106 may store the authentication application 108, or the UE 102 may locally store the authentication application 108 in memory. In the some implementations, the authentication application 108 can be temporarily stored in UE memory or in the SIM 106. For example, the UE 102 may uninstall the authentication application in response to expiration of a time period, a specified number of authentications, or other criteria. In some implementations, a third-party device (e.g., NFC smart poster, NFC reader) may store the authentication application 108. In these instances, the UE 102 may transmit information identifying the authentication application 108 through, for example, a wireless connection. For example the UE 102 may transmit the authentication request, the authentication parameters, or other authentication information directly to the authentication application 108 executed by a third-party device.

The PLMN 104 may communicate with the UE 102 using a technology such as one based on orthogonal frequency division multiplexing (OFDM), orthogonal frequency division multiple access (OFDMA), Single Carrier Frequency Division Multiple Access (SC-FDMA), Discrete Fourier Transform Spread Orthogonal Frequency Division Multiplexing (DFT-SOFDM), space-division multiplexing (SDM), frequency-division multiplexing (FDM), time-division multiplexing (TDM), code division multiplexing (CDM), or others. The PLMN 104 may transmit information using medium access control (MAC) and Physical (PHY) layers. The PLMN 104 may be based on Long Term Evolution (LTE), Global System for Mobile Communication (GSM), Code Division Multiple Access (CDMA), Universal Mobile Telecommunications System (UMTS), Unlicensed Mobile Access (UMA), or others wireless technologies.

Network 116 facilitates wireless or wired communication between local or remote computers and PLMN 102. For example, the network 116 may be a cable network, satellite network, IPTV network, the Internet, an enterprise network, and/or other network. In some implementations, the network 116 may be all or a portion of an enterprise or secured network. While illustrated as single network, network 116 may be a continuous network logically divided into various sub-nets or virtual networks without departing from the scope of this disclosure, so long as at least a portion of network 116 may facilitate communications of services with the PLMN 104. In some implementations, network 116 encompasses any internal or external network, networks, sub-network, or combination thereof operable to facilitate communications between various computing components in system 100. Network 116 may communicate, for example, Internet Protocol (IP) packets, Frame Relay frames, Asynchronous Transfer Mode (ATM) cells, voice, video, data, and other suitable information between network addresses. Network 116 may include one or more local area networks (LANs), radio access networks (RANs), metropolitan area networks (MANs), wide area networks (WANs), all or a portion of the global computer network known as the Internet, and/or any other communication system or systems at one or more locations.

In some aspects of operation, the UE 102 transmits a request to the PLMN 104 to access one or more services. In some implementations, the request may transmit information identifying the authentication application 108. In response to the request, the PLMN 104 transmits an authentication request to the UE identifying the authentication application 108. The authentication request may include authentication parameters and an application ID identifying the authentication application 108. The UE 102 passes the authentication request or the authentication parameters to the authentication application 108. As previously discussed, the authentication application 108 may be locally stored in ME memory or the SIM 106 in addition to the legacy authentication application or reside in a third-party device configured to wireless communicate with the UE 102. In the SIM 106 or third-party-device implementations, the SIM 106 or third-party device passes the authentication request to the authentication application 108. Regardless, the authentication application 108 executes an authentication computation using the received authentication parameters, a secret shared with the PLMN 104, and an authentication algorithm associated with the PLMN 104. The authentication application 108 transmits the authentication response to the PLMN 104 using the UE 102.

FIG. 2 is an example of schematic representation of a long term evolution (LTE) wireless cellular communication system 200 for authenticating the UE 102 with an LTE network 204. As previously mentioned, the system 200 illustrates an example of the system 100 in FIG. 1. In particular, the PLMN 104 in FIG. 1 is an LTE network 204. In these implementations, the LTE network 204 includes an evolved packet core (EPC) 206 and an evolved universal terrestrial radio access network (E-UTRAN) 208. The EPC 208 is configured to provide services to the UE 102, if authenticated, and includes a mobility management entity (MME) 212 for authenticating the UE 102, a home subscriber server (HSS) 215 for storing user-related and subscription-related information, a serving gateway (SGW) 216 for routing user data packets, and a packet data network gateway (PGW) 220 for connecting the UE 102 to external packet data networks such as the Internet 222. The E-UTRAN 208 includes evolved NodeBs (eNBs) 224a and 224b, and the EPC 208 is communicably coupled to the UE 102 through the eNB 224a.

Turning to a more detailed description of the EPC 206, the MME 212 is a control node for the E-UTRAN 208. In some implementations, the MME 212 can include any software, hardware, firmware, or combination thereof configured to execute one or more of the following: managing and storing UE contexts; generating temporary IDs for UEs; managing idle state mobility; distributing paging messages; controlling security functions such as authentication; controlling EPS bears; coordinating lawful interception; selecting the SGW and PGW; or others. In regards to authentication, the MME 212 may receive a request to attach to the LTE network 204. In some implementations, the attachment request may include an application ID that identifies the authentication application 108. For example, the UE may transmit to the MME 212 via the eNB 224a a plurality of application IDs including the application ID mapped to the authentication application 108. In some instances, the UE may transmit a single application ID that includes or otherwise identifies a mobile country code (MCC) and a mobile network code (MNC) assigned to the LTE network 204. In response to the request, the MME 212 may transmit, to the HSS 214, a request for authentication information, including the IMSI assigned to the UE 102, and receive a response from the HSS 214 including at least an expected response (XRES) generated by the HSS, an authentication parameter (AUTN) 214 and a random number (RAND) used to generate the RES or XRES. In some implementations, the MME 212 may identify an application ID for the authentication application 108 based on the authentication information response. Regardless, the MME 212 transmits, through the eNB 212a, an authentication request identifying the authentication application 108. After the authentication application 108 executes the authentication computation, the MME 212 may receive, from the UE 102, an authentication response and determine whether the response (RES) matches the XRES. If verified, the MME 212 authenticates the UE 102 and grants access to the LTE network 204.

The HSS 214 is a database that is configured to store subscription-related information to support other call control and session management entities. For example, the HSS 214 may store or otherwise identify one or more of the following: user identification; numbering profiles; service profiles; shared secrets; authentication algorithms; IMSIs; subscriber authentication keys (Ks); location information; or other information. In some implementations, the HSS 214 is configured to execute one or more of the following: generate security information for mutual authentication; integrity checking and ciphering; provide location information for UEs; or others. In regards to authentication, the HSS 214 identifies a subscriber authentication key K and authentication algorithm assigned to the authentication application 108. In addition, the HSS 214 may generate a random number (RAND). The HSS 214 generates an expected authentication response (XRES) and an authentication parameter (AUTN) using the identified subscriber authentication key K, the identified authentication algorithm, and the generated RAND. The HSS 214 transmits at least the XRES, the RAND and the authentication parameter (AUTN) to the MME 212.

The SGW 206 can serve as a local mobility anchor, such that the packets are routed through this point for intra EUTRAN mobility and mobility with other legacy 2G/3G systems. In addition, the SGW 206 may execute user plane tunnel management and switching. The PGW 220 may provide connectivity to the services domain comprising external networks, such as the Internet 222.

The eNB 224a and 224b can be a radio base station that may control all or at least some radio related functions in a fixed part of the system 200. For example, the eNB 224a and 224b may provide radio interfaces within the associated coverage area or cell. The eNBs, including eNB 224a and 224b, may be distributed throughout the LTE network 204 to provide a wide area of coverage. In short, the eNB 224a directly communicates with at least the UE 102, the eNB 112b, and the EPC 206. The eNB 224a includes service areas, i.e., cells, and the eNB 224a serves the UE 102, which operate in an associated cell. In other words, the eNB 224a communicates directly with the UE 102. In some implementations, the eNB 112a or 112b may be in a one-to-many relationship with UEs. For example, the eNB 112a may serve multiple UEs, including UE 102, within the cell, but the UE 102 may be connected to one eNB 112a at a time. In some implementations, the EUTRAN 208 can include one or more eNBs (e.g., eNB 224a, eNB 224b) and one or more UEs (e.g., UE 102) without departing from the scope of the disclosure. In some implementations, the eNBs 224a and 224b can be in a many-to-many relationship with UEs. For example, UE 102 and another UE may be connected to both eNB 224a and eNB 224b. The eNB 224a may be connected to eNB 224b with which mobility procedures (e.g., cell handover, cell reselection) may be executed for the UE 102 when switching between associated cells. The eNB 112a may determine mobility parameters (e.g., time-to-trigger, measurement report event trigger threshold, cell reselection timer, cell reselection hysteresis parameter) for the UE 102.

In some aspects of operation, the UE 102 transmits, to the MME 212 via the eNB 224a, a request to access one or more services. In some implementations, the request may transmit information identifying the authentication application 108. In response to the request, the MME 212 transmits, to the HSS 214, a request for information to authenticate the UE 102. For example, the MME 212 may transmit an IMSI identifying the UE 102 and information identifying the authentication application 108. In response to the request, the HSS 214 may identify a subscriber authentication key K and authentication algorithm associated with the authentication application 108. In addition, the HSS 214 may generate a RAND and generate an XRES using the RAND, the identified subscriber authentication key K, and the identified authentication algorithm. The HSS 214 may transmit the XRES and the RAND, along with additional information, to the MME 212. In response to the authentication information, the MME 212 may transmit an authentication request, including the RAND, to the UE 102 through the eNB 224a. In some implementations, the authentication request may identify the authentication application 108. As previously mentioned, the authentication request may include authentication parameters and an application ID identifying the authentication application 108. In response to the request, the UE 102 may pass the authentication request or the authentication parameters to the authentication application 108. The authentication application 108 may be locally stored in UE memory or the SIM 106 in addition to the legacy authentication application or reside in a third-party device configured to wireless communicate with the UE 102. In the SIM-based or third-party-device implementations, the SIM 106 or third-party device passes the authentication request to the authentication application 108. Regardless, the authentication application 108 executes an authentication computation using the received authentication parameters, a subscriber authentication key, and an authentication algorithm associated with the LTE network 204. The authentication application 108 transmits the authentication response to the MME 212 using the UE 102.

FIG. 3 is an example of schematic representation of a UMTS wireless cellular communication system 300 for authenticating the UE 102 with the UMTS network 304. As previously mentioned, the system 300 illustrates an example of the system 100 in FIG. 1. In particular, the PLMN 104 of FIG. 1 is a UMTS network 304. In the illustrated implementation, the UMTS network 304 includes a third generation partnership project (3GPP) general packet radio service (GPRS) packet-switched core network 306 and a UMTS-based radio access network (RAN) 308, which is referred to as a UTRAN. The core network 306 is configured to provide services to the UE, if authenticated, and includes a serving GPRS support node (SGSN) for authenticating the UE, a home location register (HLR) 314 for storing user-related and subscription-related information, a mobile switching center (MSC) 316 for routing voice calls and SMS messages, and a Gateway GPRS Support Node (GGSN) 220 for interworking between the core network 306 and external packet switched networks such as the Internet 322. The UTRAN 308 includes Node-B 324a and 324b and a radio network controller (RNC) 326 for controlling the Node-B 324a and 324b, and the core network 308 is communicably coupled to the UE 102 through the Node-B 224a.

Turning to a more detailed description of the GPRS core network 306, the SGSN 312 can include any software, hardware, firmware, or combination thereof configured to deliver data packets from and to the UEs (e.g., UE 102) within an associated geographical service area. In some implementations, the SGSN 312 can execute one or more of the following: packet routing and transfer; mobility management (e.g., attach/detach, location management); logical link management; authentication; charging functions; or others. In regards to authentication, the SGSN 312 may receive a request to attach to the UMTS network 304. In some implementations, the attach request may include an application ID that identifies the authentication application 108. For example, the UE may transmit to the SGSN 312 via the Node-B 324a a plurality of application IDs including the application ID mapped to the authentication application 108. In some instances, the UE 102 may transmit a single application ID that includes or otherwise identifies an MCC and an MNC assigned to the UMTS network 304. In response to the request, the SGSN 312 may transmit, to the HLR 314, a message Send Authentication Info and receive at least an authentication triplet from the HLR 314. The authentication triplet includes a random number between 0 and $2^{128}-1$ (RAND), signed response (SRES), and a ciphering key (Kc) which is computed using the A8 algorithm and is used by the GPRS Encryption Algorithm (GEA). In some implementations, the SGSN 312 may identify an application ID for the authentication application 108 based on the authentication information response. For example, the SGSN 312 may receive Send Authentication Info Ack including the authentication triplet, and, in addition, this message may also include the application ID for the authentication application 108. Regardless, the SGSN 312 transmits, through the Node B 324a, an authentication request identifying the authentication application 108. After the authentication application 108 executes the authentication computation, the SGSN 312 may receive, from the UE 102, an authentication response and determine whether the response matches the XRES. If so, the SGSN 312 may authenticate the UE 102 and grant access to the UMTS network 304. In summary, UMTS systems execute mutual authentication (the network authenticates the device and the device authenticates the network). In GPRS, the system only executes authentication one way, i.e., the network authenticates the device.

As for GPRS authentication, when a subscriber is added to a home network for the first time, a Subscriber Authentication Key (Ki) is assigned in addition to the IMSI to enable the authentication. At the network side, the key Ki is stored in the AUC of the home PLMN. A PLMN may contain one or more AUC. At the subscriber side, the Ki must be stored in the SIM 106. This function may execute an authentication procedure including management of the keys inside the fixed network subsystem. The authentication procedure may be based on the A3 algorithm. The A3 algorithm is implemented at both the network side and the MS side. This algorithm calculates independently on both sides the Signature Response (SRES) from the Ki and a Random Number (RAND) offered by the network, i.e., SRES=A3(Ki, RAND). The Ki and IMSI are allocated at subscription time. The UE 102 transmits its SRES value to the network 304 that compares it with its calculated value. If both values agree, then authentication is successful.

The HLR 314 is a database that is configured to store subscription-related information to support other call control and session management entities. For example, the HSS 314 may store or otherwise identify one or more of the following: user identification; service profiles; shared secrets; authentication algorithms; IMSIs; subscriber authentication keys (Ks); location information; or other information. In some implementations, the HLR 314 is configured to execute one or more of the following: generate security information for mutual authentication; integrity checking and ciphering; provide location information for UEs; or others. In regards to authentication, the HLR 314 identifies a subscriber authentication key K and authentication algorithm assigned to the authentication application 108. In addition, the HLR 314 may generate a random number (RAND). The HLR 314 generates an expected authentication response (XRES) using the identified subscriber authentication key K, the identified authentication algorithm, and the generated RAND. The HLR 314 transmits at least the XRES to the SGSN 312.

In some aspects of operation, the UE 102 transmits, to the SGSN 312 via the Node-B 324a, an attachment request. In some implementations, the request may identify the authentication application 108. In response to the request, the SGSN 312 transmits, to the HLR 314, a request for authentication information for the UE 102. For example, the SGSN 312 may transmit an IMSI identifying the UE 102 and an application ID for the authentication application 108. In response to the request, the HLR 314 may identify a subscriber authentication key K and authentication algorithm associated with the authentication application 108. In addition, the HLR 314 may generate a RAND and generate an XRES using the RAND, the identified subscriber authentication key K, and the identified authentication algorithm. The HLR 314 may transmit the XRES and the RAND, along with additional information, to the SGSN 312. In response to the authentication information, the SGSN 312 may transmit an authentication request, including the RAND, to the UE 102 through the Node-B 324a. In some implementations, the authentication request may identify the authentication application 108 using, for example, an application ID. The UE 102 passes the authentication request or the authentication parameters to the authentication application 108. The authentication application 108 may be locally stored in UE memory or the SIM 106 in addition to the legacy authentication application or reside in a third-party device configured to wireless communicate with the UE 102. In the SIM-based or third-party-device implementations, the SIM 106 or third-party device passes the authentication request to the authentication application 108. Regardless, the authentication application 108 executes an authentication computation using the received authentication parameters, a subscriber authentication key, and an authentication algorithm associated with the UMTS network 304. The authentication application 108 transmits the authentication response to the SGSN 312 using the UE 102.

Figure 4:
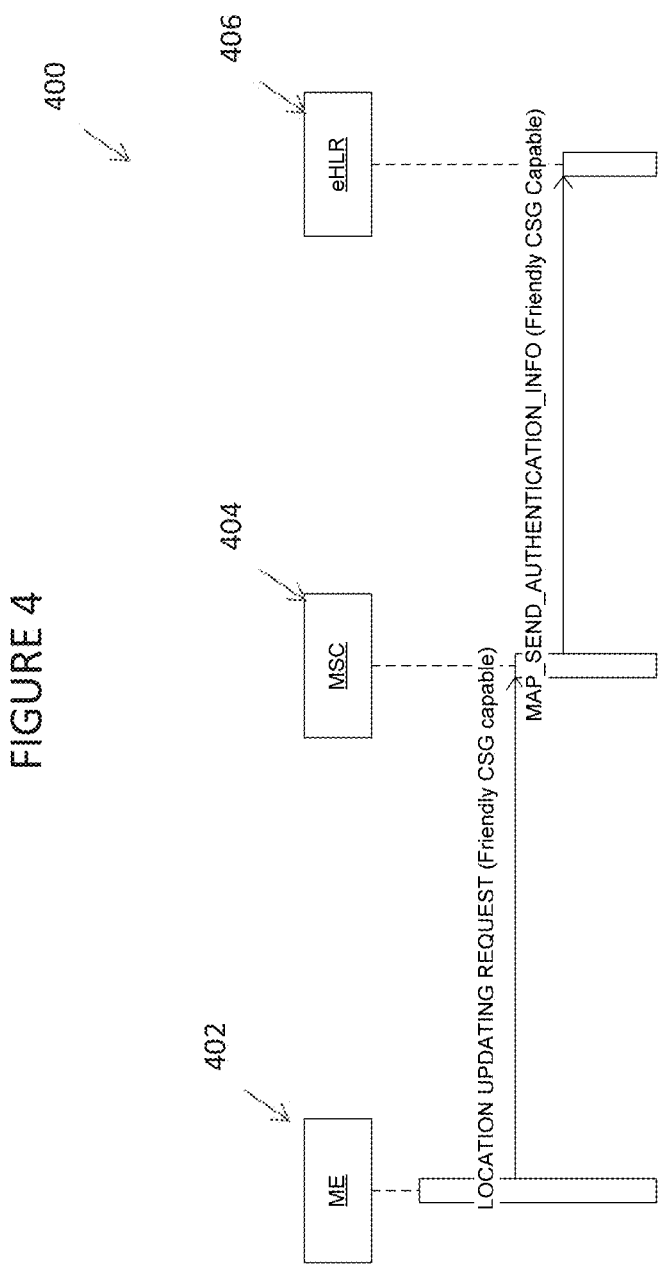
FIG. 4 is a call flow illustrating registration with a visiting PLMN (VPLMN)

FIGS. 4-7 illustrate example call flows 400-700 for addressing multiple authentication applications (installed in an ME) using a circuit switched core network in GERAN or UTRAN. Referring to FIG. 4, the call flow 400 illustrates registration with a PLMN (e.g., VPLMN). In particular, ME 402 indicates to the network support of CSG authentication. During a location area updating procedure, the ME 402 can indicate to the VPLMN if it supports CSG authentication. The ME 402 can include this indication in a classmark that is included in a LOCATION UPDATING REQUEST and transmit the request to the MSC 404. An example classmark is illustrated in table 1 below.

TABLE 1

| 8 | 7 | 6 | 5 | 4 | 3 | 2 | 1 | |
|---|---|---|---|---|---|---|---|---|
| Mobile station classmark 2 IEI | | | | | | | | octet 1 |
| Length of mobile station classmark 2 contents | | | | | | | | octet 2 |
| CSG authentication support | Revision level | | ES IND | A5/1 | RF power Capability | | | octet 3 |
| 0 spare | PS capa. | SS Screen. Indicator | | SM ca pabi. | VBS | VGCS | FC | octet 4 |
| CM3 | 0 spare | LCSVA CAP | UCS2 | SoLSA | CMSP | A5/3 | A5/2 | octet 5 |

In this example, bit 8 of octet 3 indicates that the ME 402 supports CSG authentication. In response to the indication, the MSC 404 transmits information indicating that support of CSG authentication to the HLR 406. For example, the MSC 404 may add an indicator to the MAP_SEND_AUTHENTICATION_INFO request. The indicator may also be sent in the MAP_UPDATE_LOCATION message. Regardless, an example MAP_SEND_AUTHENTICATION_INFO request is illustrated in table 2 below.

TABLE 2

| Parameter name | Request | Indication | Response | Confirm |
|---|---|---|---|---|
| Invoke id | M | M(=) | M(=) | M(=) |
| IMSI | C | C(=) | | |
| Number of requested vectors | C | C(=) | | |
| Requesting node type | C | C(=) | | |
| Re-synchronisation Info | C | C(=) | | |
| Segmentation prohibited indicator | C | C(=) | | |
| Immediate response preferred indicator | U | C(=) | | |
| Requesting PLMN ID | C | C(=) | | |
| Number of additional requested vectors | C | C(=) | | |
| Additional requested Vectors are for EPS | C | C(=) | | |
| AuthenticationSetList | | | C | C(=) |
| User error | | | C | C(=) |
| Provider error | | | | O |

TABLE 2-continued

| Parameter name | Request | Indication | Response | Confirm |
|---|---|---|---|---|
| CSG authentication supported by UE | C | C(=) | | |

In this example, the parameter "CSG authentication supported by UE" indicates that the ME 402 supports CSG authentication.

Figure 5:
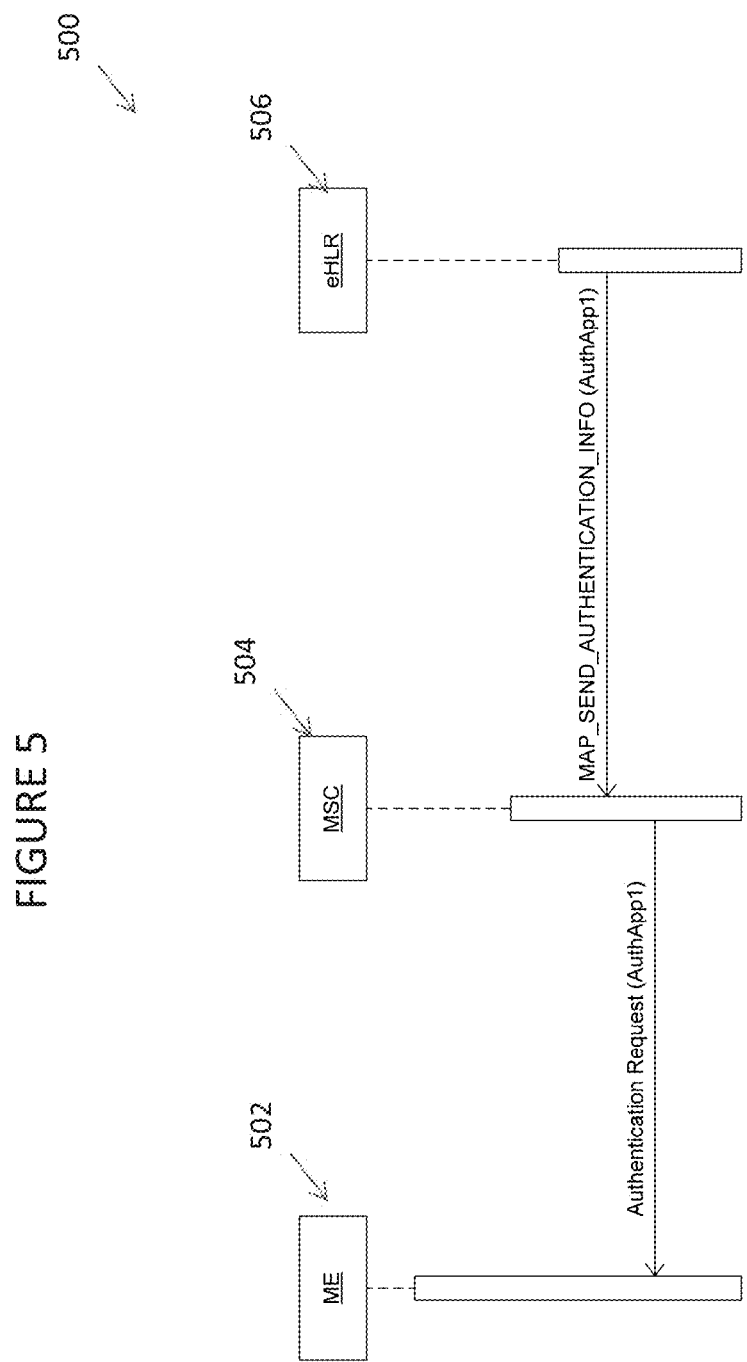
FIG. 5 is a call flow illustrating authentication request identifying an authentication application.

Referring to FIG. 5, the call flow 500 identifies an authentication application using an authentication request. In particular, HLR 506 transmits, through MSC 504, information identifying a specific authentication application to use for the authentication computation. For example, the HLR 506 may send an application identifier identifying an authentication application, in this example AuthApp1, to the ME 502. By including the application ID identifying an authentication application, the HLR 506 implies the support of the identified authentication application. In some implementations, the HLR 506 may include both the application ID identifying an authentication application and an indication of support of CSG authentication. This indication may be included in broadcast system information in, for example, the MAP_SEND_AUTHENTICATION_INFO response or an Authentication Request message. As illustrated, the HLR 506 transmits to the MSC 504 the application ID identifying an authentication application for the ME 502 to execute the authentication application using a MAP_SEND_AUTHENTICATION_INFO response that is also extended with a CSG authentication Application Id. An example MAP_SEND_AUTHENTICATION_INFO response is illustrated in table 3 below.

TABLE 3

| Parameter name | Request | Indication | Response | Confirm |
|---|---|---|---|---|
| Invoke id | M | M(=) | M(=) | M(=) |
| IMSI | C | C(=) | | |
| Number of requested vectors | C | C(=) | | |
| Requesting node type | C | C(=) | | |
| Re-synchronisation Info | C | C(=) | | |
| Segmentation prohibited indicator | C | C(=) | | |
| Immediate response preferred indicator | U | C(=) | | |
| Requesting PLMN ID | C | C(=) | | |
| Number of additional requested vectors | C | C(=) | | |
| Additional requested Vectors are for EPS | C | C(=) | | |
| AuthenticationSetList | | | C | C(=) |
| User error | | | C | C(=) |
| Provider error | | | | O |
| Authentication Application Id | | | C | C(=) |

The parameter "Authentication Application Id" identifies the authentication application for the ME 502 to use to compute an authentication response. If this parameter is not present, the ME 502 may default to using the legacy SIM authentication application. The MSC 504 transmits the authentication application ID to the ME 502 using an authenticate command that is extended with the authentication application ID information element.

The MSC 504 initiates the authentication procedure by transmitting an AUTHENTICATION REQUEST message across the radio interface and starts the timer T3260. The AUTHENTICATION REQUEST message may include parameters to calculate the response parameters. In a GSM authentication challenge, the AUTHENTICATION REQUEST message may also include the GSM ciphering key sequence number allocated to the key which may be computed from the given parameters. In a UMTS authentication challenge, the AUTHENTICATION REQUEST message may also include the ciphering key sequence number allocated to the key set of UMTS ciphering key, UMTS integrity key, and GSM ciphering key which may be computed from the given parameters. Furthermore, the ciphering key sequence number may be linked to a GSM $Kc_{128}$ if, after the authentication procedure, the network in A/Gb mode selects an A5 ciphering algorithm that requires a 128-bit ciphering key. Optionally, in the case of authentication of a CSG network, the MSC 504 may include an authentication application identifier as part of the Authentication Request message. The ME 502 may determine if the identified authentication application is installed in ME memory or on the SIM. An example Authentication Request message is illustrated in table 4 below.

maximum length of 18 octets. In an EPS authentication challenge, the response is calculated by the application referenced by the CSG Authentication Application Id.

Figure 6:
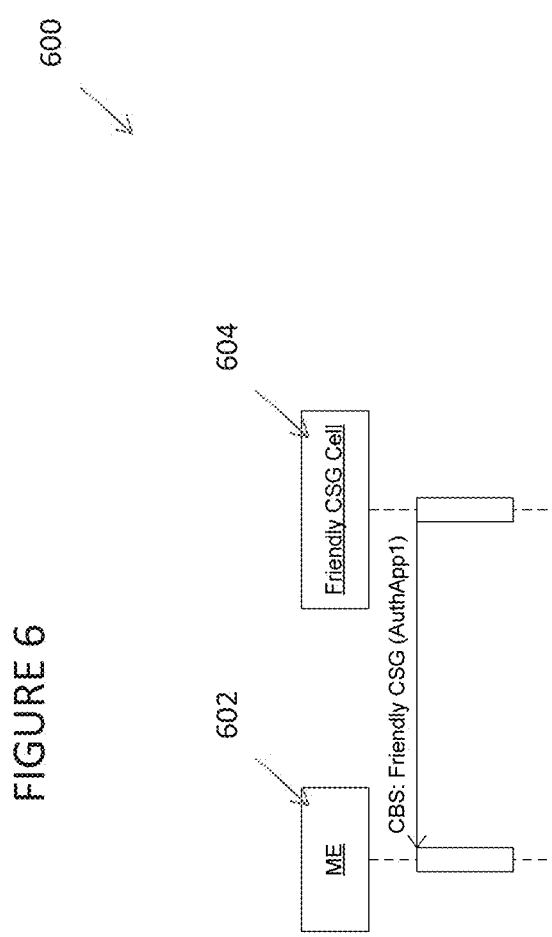
FIG. 6 is a call flow illustrating a broadcast identifying an authentication message.
Figure 7:
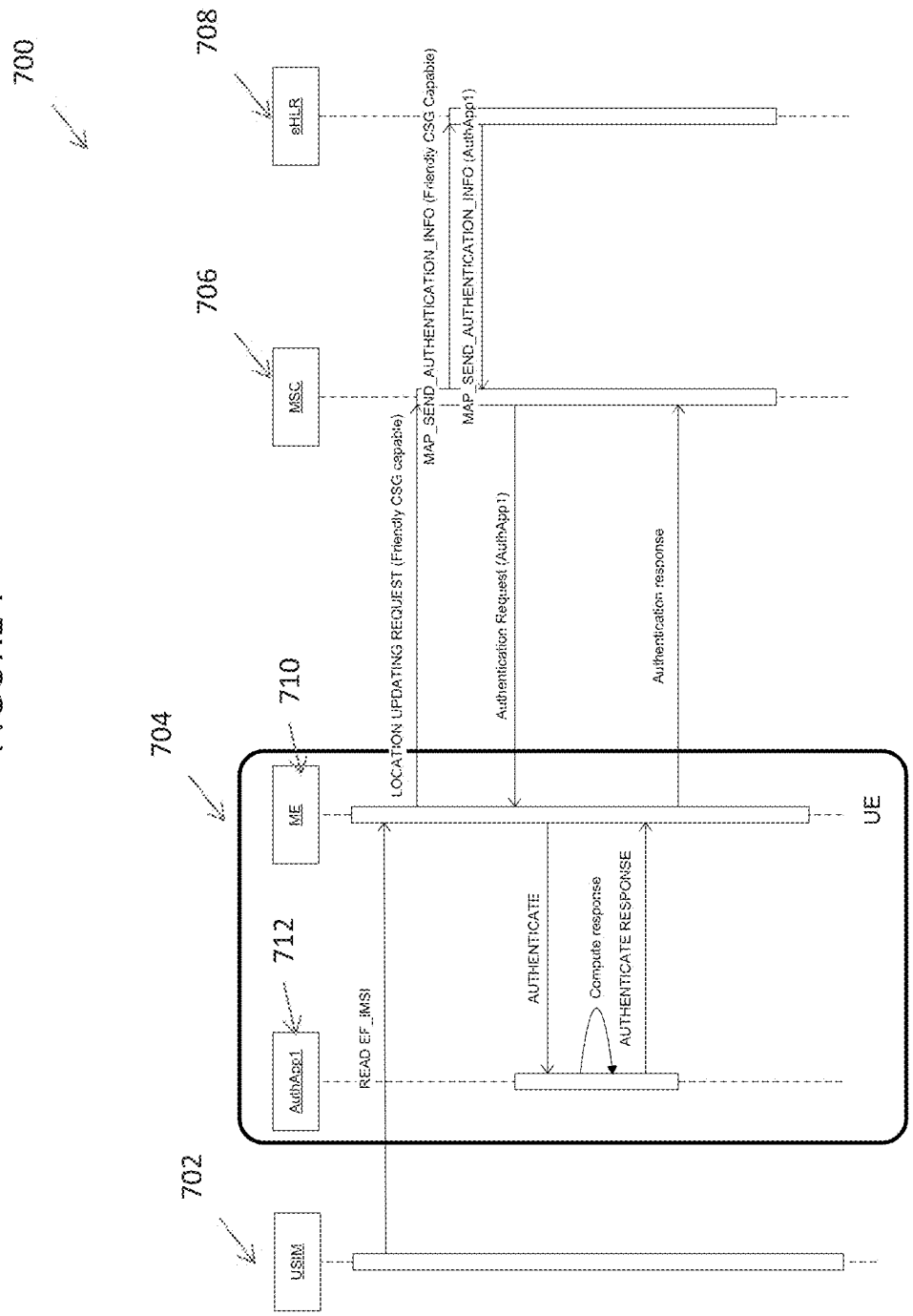
FIG. 7 is a call flow illustrating a user equipment (UE) redirecting an authentication challenge to an identified authentication application.

Referring FIG. 6, the call flow 600 illustrates a broadcast message identifying an authentication application. In particular, the PLMN 604 transmits, to ME 602, information identifying the authentication application. In some implementations, the PLMN 604 may be a VPLMN and execute CSG cell broadcasts including a unique ID of the authentication application (AuthApp1). In other words, the PLMN 604 may identify, to the ME 603, an authentication application by using a broadcast channel. In these instances, when the ME 602 receives an authenticate command from the PLMN 602, the ME 602 may automatically use the identified authentication application for authentication computations without receiving an indicator in the authentication command. This process may reduce the number of times the authentication application ID is transmitted over the air.

TABLE 4

| IEI | Information element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Authentication request message type | Message type 9.8 | M | V | 1 |
| | NAS key set identifier$_{ASME}$ | NAS key set identifier 9.9.3.21 | M | V | ½ |
| | Spare half octet | Spare half octet 9.9.2.9 | M | V | ½ |
| | Authentication parameter RAND (EPS challenge) | Authentication parameter RAND 9.9.3.3 | M | V | 16 |
| | Authentication parameter AUTN (EPS challenge) | Authentication parameter AUTN 9.9.3.2 | M | LV | 17 |
| | CSG Authentication Application Id | CSG Authentication Application Id 9.9.3.X | O | V | 17 |

The information element "CSG Authentication Application Id" indicates, to the ME 502, the authentication application to use to calculate the authentication response. The Authentication response parameter information element is coded as shown in table 5 and table 6 below.

TABLE 5

| 8 | 7 | 6 | 5 | 4 | 3 | 2 | 1 | |
|---|---|---|---|---|---|---|---|---|
| CSG Authentication Application Id IEI | | | | | | | | octet 1 |
| CSG Authentication Application Id Value | | | | | | | | octet 2 |
| | | | | | | | | octet 17 |

TABLE 6

CSG Authentication Application Id

In particular, table 5 illustrates a CSG Authentication Application information element, and table 6 illustrates an Authentication Parameter RAND information element. The Authentication response parameter may be a type 4 information element with a minimum length of 6 octets and a Referring FIG. 7, the call flow 700 illustrates a UE redirecting an authentication challenge to an identified authentication application. Initially, SIM 702 identifies an IMSI, and UE 704 transmits the IMSI in a location update request to MSC 706. The MSC 706 transmits a request for authentication information to HLR 708. After receiving the requested authentication information, the MSC 706 transmits an authentication request message to the UE 704. Upon receiving the authentication request message from the PLMN, ME 710 reads the Authentication Application Id value included in the message and locates authentication application 712 associated with the identifier. In response to identifying the specified authentication application 712, ME 710 sends authentication challenge parameters (e.g., NAS key set, RAND, AUTH) to application 712. The specified authentication application 712 computes the response parameter SRES or RES. The ME 710 transmits the computed SRES or RES value to HLR 708 through MSC 706. In some implementations, if the Authentication Request message omits an Authentication Application Id, the ME 710 may pass the message to the legacy SIM authentication application on SIM 702.

If the ME 710 is unable to map a received unique ID to an authentication application, the UE 704 may send an AUTHENTICATION FAILURE message that includes a reject cause value of 'Unknown Authentication Application Identifier'. In a UMTS authentication challenge, the authentication procedure may be extended to allow the MS 710 to check the authenticity of the core network, which may allow, for instance, detection of a false base station. Following a UMTS authentication challenge, the MS 710 may reject the core network on the grounds of an incorrect AUTN parameter. This parameter may contain two possible causes for authentication failure: (1) MAC code failure; or (2) SQN failure. As for a MAC code failure, if the MS 710 determines the MAC code (supplied by the core network in the AUTN parameter) to be invalid, the MS 710 may send an AUTHENTICATION FAILURE message to the network. The AUTHENTICATION FAILURE message may include the reject cause 'MAC failure'. As for an SQN failure, if the MS 710 determines the SQN (supplied by the core network in the AUTN parameter) to be out of range, the MS 710 may send an AUTHENTICATION FAILURE message to the network. The AUTHENTICATION FAILURE message may include the reject cause 'Synch failure' and a re-synchronization token AUTS provided by the SIM 702.

Following a CSG Authentication challenge, the MS 710 may reject the core network if the core network requests an unknown Authentication Application Identifier. The MS 710 may send an AUTHENTICATION FAILURE message to the network with the reject cause 'Unknown Authentication Application Identifier'. In these implementations, the Reject Cause information element can indicate a reason why a request is rejected. An example Reject Cause information element may be coded as shown in table 7, and an example Reject Cause as a type 3 information element with 2 octets length is illustrated in table 8 below.

TABLE 7

| 8 | 7 | 6 | 5 | 4 | 3 | 2 | 1 | |
|---|---|---|---|---|---|---|---|---|
| Reject cause IEI | | | | | | | | octet 1 |
| reject cause value | | | | | | | | octet 2 |

TABLE 8

Reject cause value (octet 2)

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 1 | 0 | IMSI unknown in HLR |
| 0 | 0 | 0 | 0 | 0 | 0 | 1 | 1 | Illegal MS |
| 0 | 0 | 0 | 0 | 0 | 1 | 0 | 0 | IMSI unknown in VLR |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 1 | 0 | 1 | 1 | PLMN not allowed |
| 0 | 0 | 0 | 0 | 1 | 1 | 0 | 0 | Location Area not allowed |
| 0 | 0 | 0 | 0 | 1 | 1 | 0 | 1 | Roaming not allowed in this location area |
| 0 | 0 | 0 | 0 | 1 | 1 | 1 | 1 | No Suitable Cells In Location Area |
| 0 | 0 | 0 | 1 | 0 | 0 | 0 | 1 | Network failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | GSM authentication unacceptable |
| 0 | 0 | 0 | 1 | 1 | 0 | 0 | 1 | Not authorized for this CSG |
| 0 | 0 | 1 | 0 | 0 | 0 | 0 | 0 | Service option not supported |
| 0 | 0 | 1 | 0 | 0 | 0 | 0 | 1 | Requested service option not subscribed |
| 0 | 0 | 1 | 0 | 0 | 0 | 1 | 0 | Service option temporarily out of order |
| 0 | 0 | 1 | 0 | 0 | 1 | 1 | 0 | Call cannot be identified |
| 0 | 0 | 1 | 1 | 0 | 0 | 0 | 0 | } |
| to | | | | | | | | } retry upon entry into a new cell |
| 0 | 0 | 1 | 1 | 1 | 1 | 1 | 1 | } |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 0 | 1 | 1 | 0 | Unknown Authentication Application Identifier |
| 0 | 1 | 1 | 0 | 1 | 1 | 1 | 1 | Protocol error, unspecified |

Any other value received by the mobile station may be treated as 0010 0010, 'Service option temporarily out of order'. Any other value received by the network may be treated as 0110 1111, 'Protocol error, unspecified'.
NOTE:
The listed reject cause values are defined in Annex G.

Figure 8:
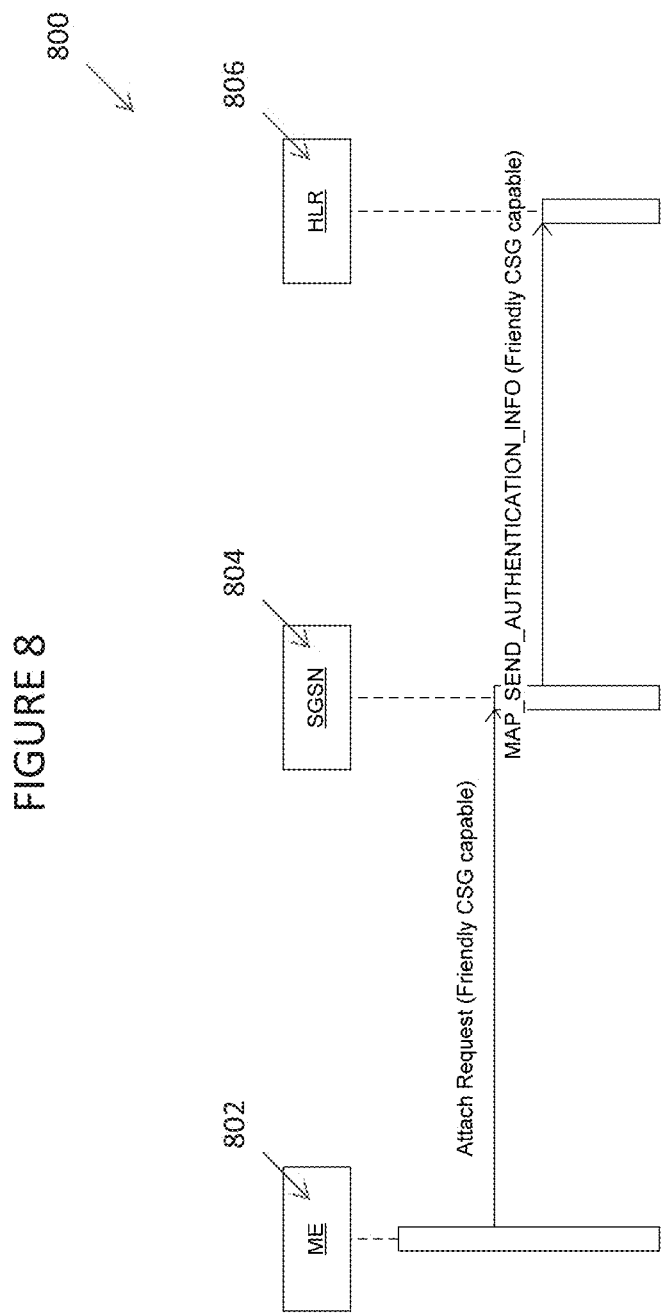
FIG. 8 is a call flow illustrating that UE indicating support of CSG authentication.
Figure 9:
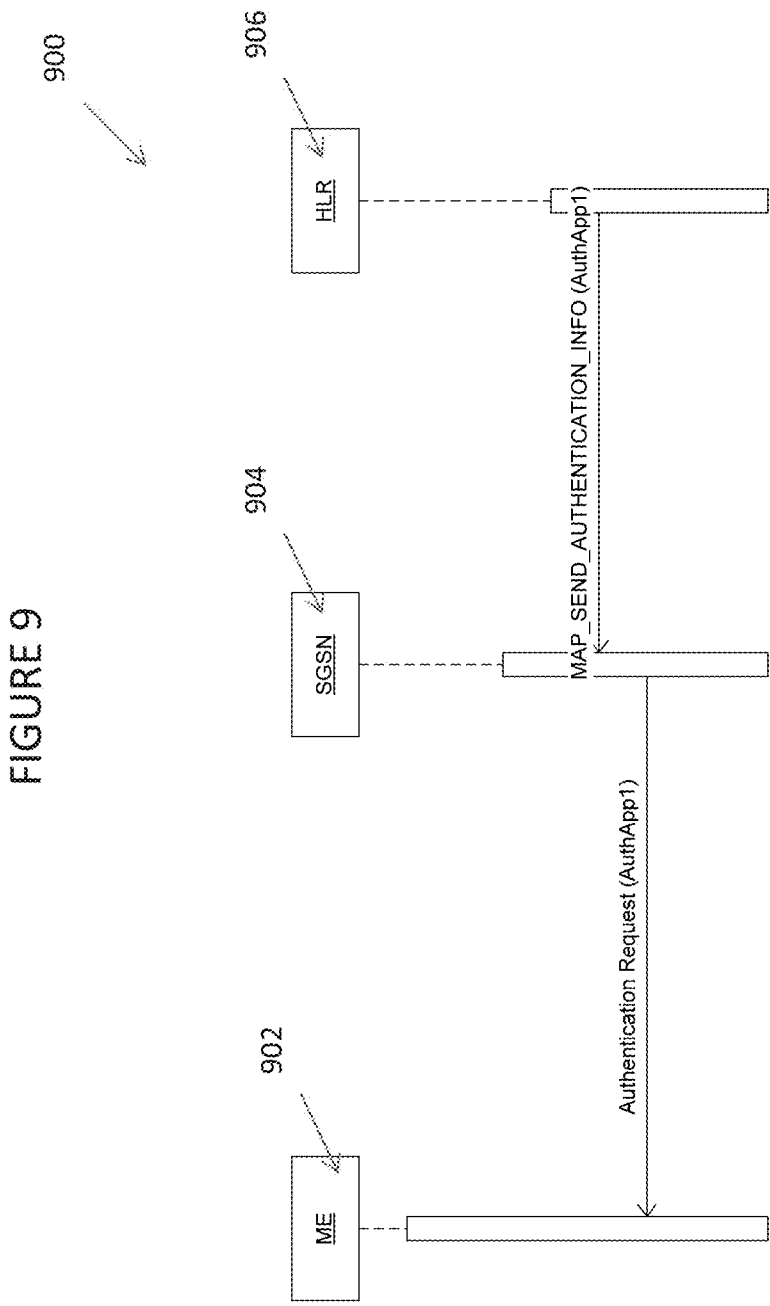
FIG. 9 is a call flow illustrating a PLMN indicating an specified authentication application to use for an authentication computation.

FIGS. 8 and 9 are call flows 800 and 900 addressing multiple authentication applications (installed in an ME) using a Packet Switched core network in GERAN or UTRAN. Referring to FIG. 8, the call flow 800 indicates, when attaching to a VPLMN, that an ME supports CSG authentication. In particular, during a GPRS/PS Attach or a Routing Area Updating procedure, ME 802 can indicate to the VPLMN if it supports CSG authentication. The ME 802 can include this indication in a classmark that is included an ATTACH REQUEST or ROUTING AREA UPDATE REQUEST. As illustrated, the ME 802 transmits, to SGSN 804, an ATTACH REQUEST message indicating support for CSG authentication. The SGSN 804 transmits, to HLR 806, a MAP_SEND_AUTHENTICATION_INFO message indicating that the ME 802 supports CSG authentication. The indicator may be included in a mobile station classmark 2 as illustrated in Table 1. The indicator may also be sent in the MAP_UPDATE_GPRS_LOCATION message.

Referring to FIG. 9, the call flow 900 illustrates a PLMN indicating a specified authentication application to use for the authentication computation. In this implementation, the PLMN sends, to ME 902, an application ID (e.g., AuthApp1) identifying an authentication application. In particular, HLR 906 transmits to SGSN 904 a MAP_SEND_AUTHENICATION_INFO message including AuthApp1, and, in response to the message, the SGSN 904 may transmit, to the ME 902, an Authentication Request message including AuthApp1. In other words, the SGSN 904 may convey, to the ME 902, the Authentication Application Id using an Authenticate Request command extended with an Authentication Application Id information Element. An example MAP_SEND_AUTHENTICATION_INFO response is illustrated in table 3 above. In this implementation, the presence of the application ID identifying an authentication application indicates that the PLMN supports the authentication application. In some implementations, the HLR 906 may include both the application ID and an indication by that the PLMN supports CSG Authentication. This indication may be included in the broadcast system information or in the MAP_SEND_AUTHENTICATION_INFO response or Authentication Request message. The ME 902 may redirect the authentication challenge to the specified authentication application as discussed with respect to the call flow 700 in FIG. 7.

Figure 10:
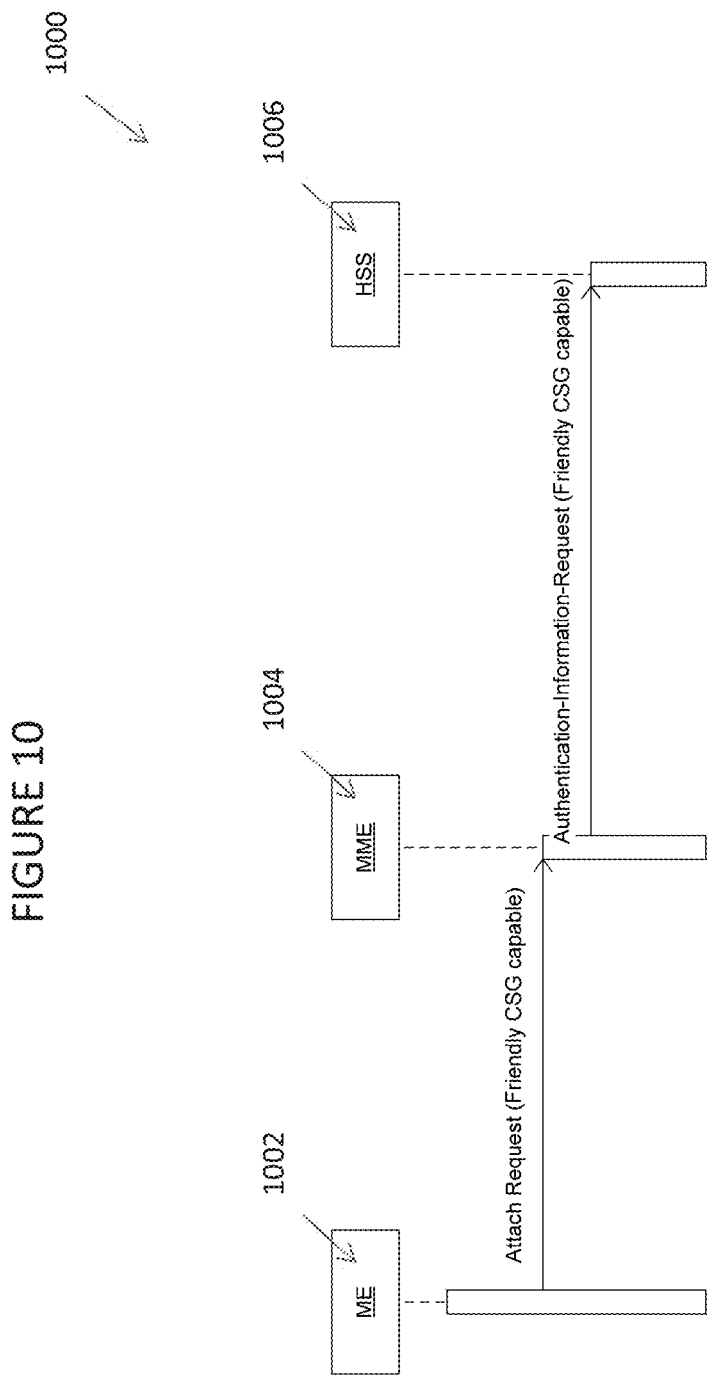
FIG. 10 is a call flow illustrating an example method for indicating to a PLMN that an ME supports CSG authentication.
Figure 11:
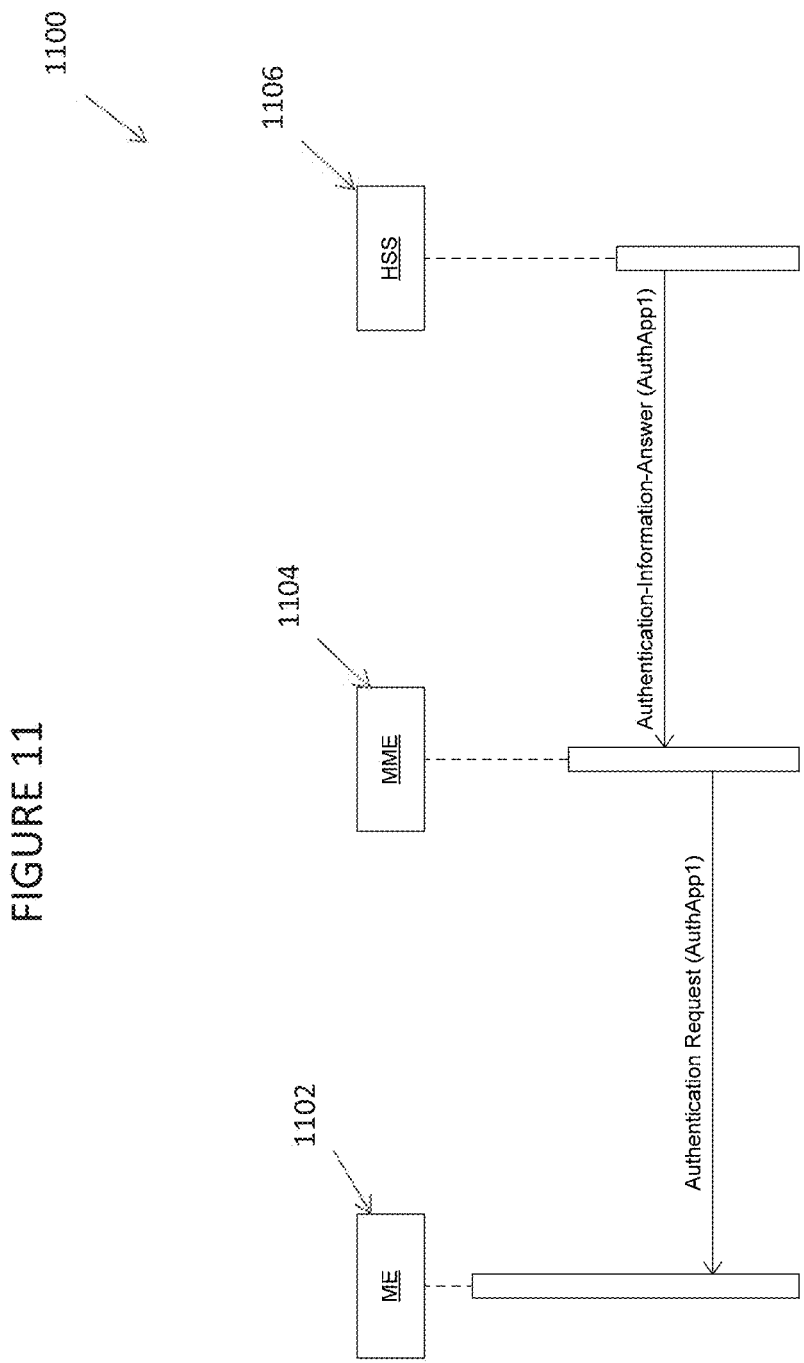
FIG. 11 is a call flow illustrating a PLMN indicating to a ME a specified authentication application.

FIGS. 10 and 11 illustrate example call flows 1000 and 1100 for addressing multiple authentication applications (installed in an ME) using an Evolved Packet System. Referring to FIG. 10, the call flow 1000 is an example method for indicating to a PLMN that an ME supports CSG authentication. In particular, ME 1002 transmits, to MME 1004, an Attach Request message indicating support of CSG authentication. In response to the message, the MME 1004 transmits, to HSS 1006, an Authentication-Information-Request message indicating that the ME 1002 supports CSG authentication. In other words, during an Attach or a Tracking Area Updating procedure, the ME 1002 can indicate to the PLMN support of CSG authentication. The ME 1002 can include this indication in a classmark that is included an ATTACH REQUEST or TRACKING AREA UPDATE REQUEST. The indicator may be included in a mobile station classmark 2 as illustrated in Table 1. The MME 1004 may add an indicator to the Supported-Features AVP in the Authentication-Information-Request command to notify the HSS 1006 that the ME 1002 supports CSG authentication. The indicator could also be sent in the Update-Location-Request message.

The Authentication-Information-Request (AIR) command, indicated by the Command-Code field set to 318 and the 'R' bit set in the Command Flags field may be sent from the MME 1004 or SGSN (not illustrated) to the HSS 1006. An example message format is as follows:

```
< Authentication-Information-Request> ::= < Diameter Header: 318,
REQ, PXY, 16777251 >
    < Session-Id >
      [ Vendor-Specific-Application-Id ]
    { Auth-Session-State }
    { Origin-Host }
    { Origin-Realm }
    [ Destination-Host ]
    { Destination-Realm }
    { User-Name }
    *[Supported-Features]
    [ Requested-EUTRAN-Authentication-Info ]
    [ Requested-UTRAN-GERAN-Authentication-
Info ]
    { Visited-PLMN-Id }
    [Friendly-CSG-Authentication-Indicator]
    *[ AVP ]
    *[ Proxy-Info ]
    *[ Route-Record ]
```

The Friendly-CSG-Authentication-Indicator attribute value pair (AVP) is of type Enumerated. The following values are defined: FRIENDLY_CSG_AUTHENTICATION_NOT_SUPPORTED_BY_UE (0); and FRIENDLY_CSG_AUTHENTICATION_SUPPORTED_BY_UE (1). Table 9 illustrates an example S6a/S6d and S13/S13' specific Diameter AVPs, and Table 10 illustrates an example Authentication Information Request below.

TABLE 9

| | | | | AVP Flag rules | | | | |
|---|---|---|---|---|---|---|---|---|
| Attribute Name | AVP Code | Section defined | Value Type | Must | May | Should not | Must not | May Encr. |
| Friendly-CSG-Authentication-Indicator | ZZZZ | 7.3.X | Enumerated | O, V | | | | No |

TABLE 10

| Information element name | Mapping to Diameter AVP | Cat. | Description |
|---|---|---|---|
| IMSI | User-Name (See IETF RFC 3588 [4]) | M | This information element shall contain the user IMSI, formatted according to 3GPP TS 23.003 [3], clause 2.2. |
| Supported Features (See 3GPP TS 29.229 [9]) | Supported-Features | O | If present, this information element shall contain the list of features supported by the origin host. |

TABLE 10-continued

| Information element name | Mapping to Diameter AVP | Cat. | Description |
|---|---|---|---|
| Requested E-UTRAN Authentication Info (See 7.3.11) | Requested-EUTRAN-Authentication-Info | C | This information element shall contain the information related to authentication requests for E-UTRAN. |
| Requested UTRAN/GERAN Authentication Info (See 7.3.12) | Requested-UTRAN-GERAN-Authentication-Info | C | This information element shall contain the information related to authentication requests for UTRAN or GERAN. |
| Visited PLMN ID (See 7.3.9) | Visited-PLMN-ID | M | This IE shall contain the MCC and the MNC of the visited PLMN, see 3GPP TS 23.003 [3]. |
| Friendly-CSG-Authentication-Indicator (See 7.3.X) | Friendly-CSG-Authentication-Indicator | O | If present, this IE shall indicate if the UE supports CSG Authentication. |

Referring to FIG. 11, the call flow 1100 illustrates a PLMN indicating to a ME a specified authentication application. As illustrated, HSS 1106 transmits, to MME 1104, an Authentication-Information-Answer message including an application ID AuthApp1. In response to at least the message, the MME 1104 transmits, to ME 1102, an Authentication Request message including the application ID AuthApp1. In other words, the PLMN (e.g., VPLMN) may send an application ID (e.g., a unique ID) identifying an authentication application, in this example AuthApp1, to the ME 1102. In these implementations, the application ID identifying an authentication application indicates that the PLMN supports the specified authentication application. In some implementations, the PLMN may include both the application ID and an indication by the PLMN of support of CSG authentication. The PLMN may transmit this indication in broadcast system information or in an Authentication-Information-Answer command or Authentication Request message. Diameter signaling may also be used on the S6d interface, which may enable the HSS 1106 to send the same indication to an SGSN as in Table 9. The HSS 1106 may communicate, to the MME 1104, the application ID using a Authentication-Information-Answer command that is extended with a CSG authentication application Id. In some implementations, the HSS 1106 may communicate the application ID in other messages such as an Update-Location-Answer command.

The Authentication-Information-Answer (AIA) command, indicated by the Command-Code field set to 318 and the 'R' bit cleared in the Command Flags field, may be sent from the HSS 1106 to MME 1104 or SGSN. The message format may be as followed:

```
< Authentication-Information-Answer> ::= < Diameter Header: 318,
PXY, 16777251 >
            < Session-Id >
            [ Vendor-Specific-Application-Id ]
            [ Result-Code ]
            [ Experimental-Result ]
            [ Error-Diagnostic ]
            { Auth-Session-State }
            { Origin-Host }
            { Origin-Realm }
            * [Supported-Features]
            [ Authentication-Info ]
            [Authentication-Application-Id]
            *[ AVP ]
            *[ Failed-AVP ]
            *[ Proxy-Info ]
            *[ Route-Record ]
```

The Authentication-Application-Id AVP is of type OctetString. This AVP may include the Authentication Application Id, and, if this parameter is not present, the ME 1102 may default to the legacy SIM authentication application. Table 11 illustrates an example S6a/S6d and S13/S13' specific Diameter AVPs, and Table 12 illustrates an example Authentication Information Answer message.

TABLE 11

| Attribute Name | AVP Code | Section defined | Value Type | AVP Flag rules | | | | |
|---|---|---|---|---|---|---|---|---|
| | | | | Must | May | Should not | Must not | May Encr. |
| Authentication-Application-id | AAAA | 7.3.Y | OctetString | O, V | | | | No |

TABLE 12

| Information element name | Mapping to Diameter AVP | Cat. | Description |
|---|---|---|---|
| Result (See 7.4) | Result-Code/ Experimental-Result | M | This IE shall contain the result of the operation. This IE shall contain the Result-Code AVP shall be used to indicate success/errors as defined in the Diameter Base Protocol. The Experimental-Result AVP shall be used for S6a/S6d errors. This is a grouped AVP which shall contain the 3GPP Vendor ID in the Vendor-Id AVP, and the error code in the Experimental-Result-Code AVP. The following errors are applicable in this case: User Unknown Unknown EPS Subscription |
| Error-Diagnostic | Error-Diagnostic | O | If the Experimental Result indicated "Unknown EPS Subscription", Error Diagnostic may be present to indicate whether or not GPRS subscription data are subscribed (i.e. whether or not Network Access Mode stored in the HSS indicates that only circuit service is allowed). |
| Supported Features (See 3GPP TS 29.229 [9]) | Supported-Features | O | If present, this information element shall contain the list of features supported by the origin host. |
| Authentication Info (See 7.3.17) | Authentication-Info | C | This IE shall contain the Authentication Vectors. |
| Authentication Application ID | Authentication-Application-Id | O | If this IE is present the UE shall use this Authentication Application to compute its authentication response. |

The MME 1104 may convey the Authentication Application Id to the ME 1102 using the Authenticate command that is extended with the Authentication Application Id information element.

During a NAS signaling connection, the PLMN may initiate an authentication procedure at any time, with a few restrictions applicable after handover or inter-system handover to Si mode. The network may initiate the authentication procedure by sending an AUTHENTICATION REQUEST message to the ME 1102 and starting the timer T3460. The AUTHENTICATION REQUEST message may include the parameters used to calculate the authentication response. Optionally, in the case of authentication of a CSG network, the PLMN may include an Authentication Application identifier as part of the Authentication request message. The ME 1102 may determine if this application is installed in local memory or on the SIM. An example Authentication Request message is illustrated in table 13 below.

TABLE 13

| IEI | Information element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Authentication request message type | Message type 9.8 | M | V | 1 |
| | NAS key set identifier$_{ASME}$ | NAS key set identifier 9.9.3.21 | M | V | ½ |
| | Spare half octet | Spare half octet 9.9.2.9 | M | V | ½ |
| | Authentication parameter RAND (EPS challenge) | Authentication parameter RAND 9.9.3.3 | M | V | 16 |
| | Authentication parameter AUTN (EPS challenge) | Authentication parameter AUTN 9.9.3.2 | M | LV | 17 |
| | CSG Authentication Application Id | CSG Authentication Application Id | O | V | 17 |

The CSG authentication application Id information element may provide the UE with the Authentication Application to use to calculate the Authentication response. The Authentication response parameter information element is coded as illustrated in table 14 and 15 below. In particular, table 14 illustrates an example CSG Authentication Application information element, and table 15 illustrates an example Authentication Parameter RAND information element.

TABLE 14

| 8 | 7 | 6 | 5 | 4 | 3 | 2 | 1 | |
|---|---|---|---|---|---|---|---|---|
| CSG Authentication Application Id IEI | | | | | | | | octet 1 |
| CSG Authentication Application Id Value | | | | | | | | octet 2 |
| | | | | | | | | octet 17 |

TABLE 15

CSG Authentication Application Id

The Authentication response parameter may be a type 4 information element with a minimum length of 6 octets and a maximum length of 18 octets. In an EPS authentication challenge, the response may be calculated using the application referenced by the CSG Authentication Application Id. Regardless, the ME 1102 may redirect the authentication challenge to the specified authentication application as discussed with respect to the call flow 700 in FIG. 7.

If the ME 102 is unable to identify the authentication application using the received an application ID, the UE may send an AUTHENTICATION FAILURE message that includes a cause value of 'Unknown Authentication Application Identifier'. In an EPS authentication challenge, the ME 102 may verify the authenticity of the core network by means of the AUTN parameter received in the AUTHENTICATION REQUEST message. This process enables the ME 102 to detect a false network. During an EPS authentication procedure, the UE may reject the core network due to an incorrect AUTN parameter. This parameter may include three possible causes for authentication failure: MAC code failure; Non-EPS authentication unacceptable; and SQN failure. In regards to MAC code failure, if the ME 102 determines the MAC code (supplied by the core network in the AUTN parameter) to be invalid, the ME 102 may send an AUTHENTICATION FAILURE message to the network with the EMM cause #20 "MAC failure". In regards to Non-EPS authentication unacceptable, if the ME 102 determines that the "separation bit" in the AMF field of AUTN supplied by the core network is 0, the ME 102 may send an AUTHENTICATION FAILURE message to the network with the EMM cause #26 "non-EPS authentication unacceptable". In regards to SQN failure, if the ME 102 determines the SQN (supplied by the core network in the AUTN parameter) to be out of range, the ME 102 may send an AUTHENTICATION FAILURE message to the network with the EMM cause #21 "synch failure" and a re-synchronization token AUTS provided by the USIM. If the ME 102 returns an AUTHENTICATION FAILURE message to the network, the ME 102 may delete any previously stored RAND and RES and stop timer T3416, if running. If the ME 102 has a PDN connection for emergency bearer services established or is establishing such a PDN connection, additional ME requirements may be executed. Additionally, following a CSG authentication challenge, the ME 102 may reject the core network if the core network requests an unknown Authentication Application Identifier. The ME 102 may send an AUTHENTICATION FAILURE message to the network, with the EMM cause 'Unknown Authentication Application Identifier'. The EMM cause information element may indicate the reason why an EMM request from the UE is rejected by the network. The EMM cause information element may be coded as illustrated in table 16 and table 17 below. The EMM cause may be a type 3 information element with 2 octets length.

TABLE 16

| 8 | 7 | 6 | 5 | 4 | 3 | 2 | 1 | |
|---|---|---|---|---|---|---|---|---|
| EMM cause IEI | | | | | | | | octet 1 |
| Cause value | | | | | | | | octet 2 |

TABLE 17

Cause value (octet 2)

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 0 | 0 | 0 | 1 | 1 | 1 | 0 | EPS services not allowed in this PLMN |
| 0 | 0 | 0 | 0 | 1 | 1 | 1 | 1 | No Suitable Cells In tracking area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 0 | 1 | 0 | CS domain not available |
| 0 | 0 | 0 | 1 | 0 | 0 | 1 | 1 | ESM failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 0 | 1 | Not authorized for this CSG |
| 0 | 0 | 0 | 1 | 1 | 0 | 1 | 0 | Non-EPS authentication unacceptable |
| 0 | 0 | 1 | 0 | 0 | 0 | 1 | 1 | Requested service option not authorized |
| 0 | 0 | 1 | 0 | 0 | 1 | 1 | 1 | CS service temporarily not available |
| 0 | 0 | 1 | 0 | 1 | 0 | 0 | 0 | No EPS bearer context activated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |

TABLE 17-continued

Cause value (octet 2)

| Bits | | | | | | | | |
|---|---|---|---|---|---|---|---|---|
| 8 | 7 | 6 | 5 | 4 | 3 | 2 | 1 | |
| 0 | 1 | 1 | 0 | 0 | 1 | 1 | 0 | Unknown Authentication Application Identifier |
| 0 | 1 | 1 | 0 | 1 | 1 | 1 | 1 | Protocol error, unspecified |

Any other value received by the mobile station shall be treated as 0110 1111, "protocol error, unspecified". Any other value received by the network shall be treated as 0110 1111, "protocol error, unspecified".

Figure 12:
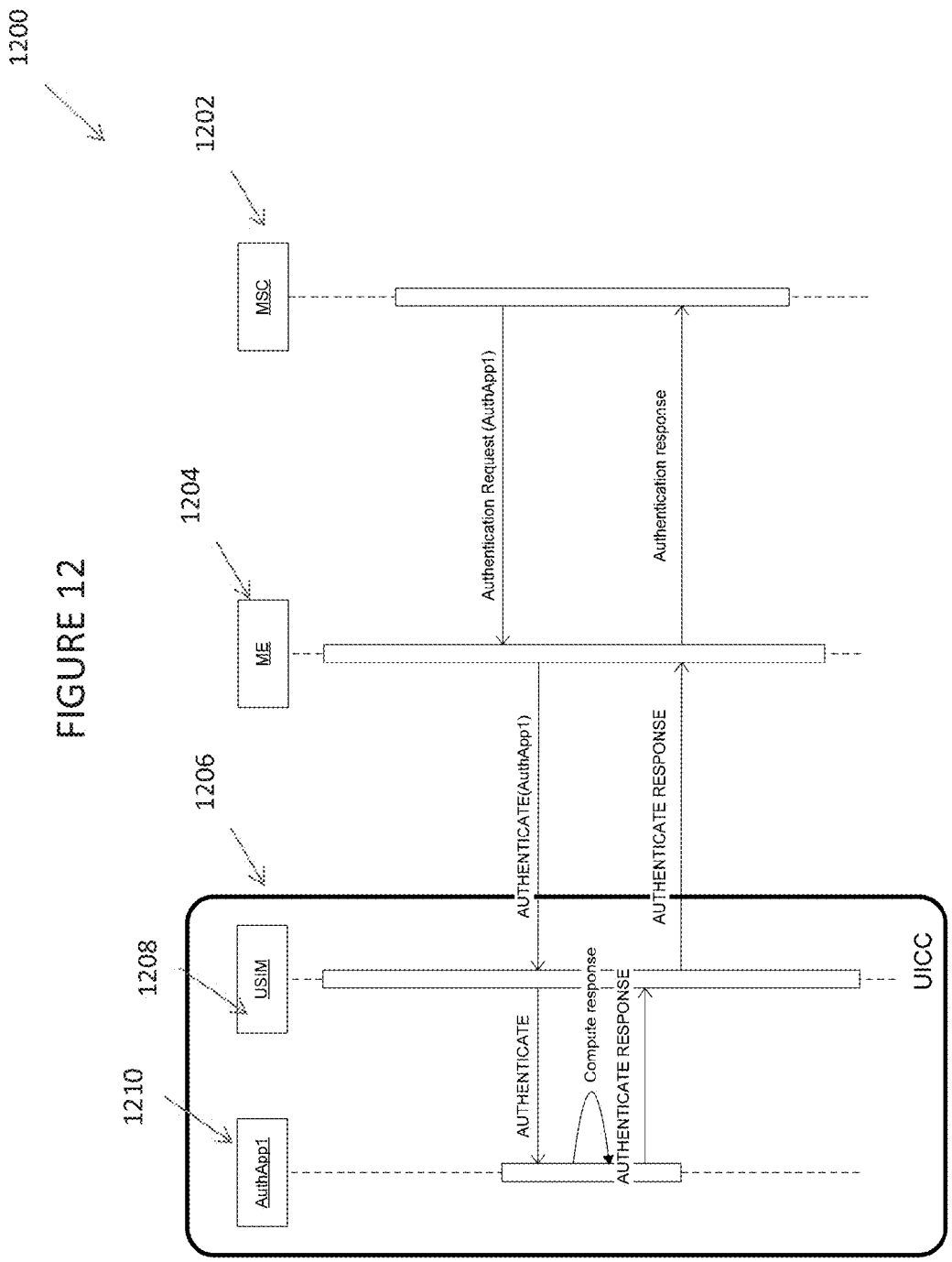
FIG. 12 is a call flow illustrating an example method for addressing multiple authentication applications installed in a SIM.

FIG. 12 is a call flow 1200 illustrating an example method for addressing multiple authentication applications installed in a SIM. For example, an ME may indicate to the SIM what authentication application to execute. As illustrated, MSC 1202 transmits an authentication request identifying an authentication application to ME 1204. The ME 1204 passes the authentication request to UICC 1206, and USIM 1208 passes the authenticate request to authentication application 1210, which executes the authentication computation to generate an authentication response. In some implementations, the UICC 1206 passes the authentication request directly to the authentication application 1210 without initially passing the authentication request to the USIM 1208. The authentication application 1210 transmits the authentication response to the MSC 1202 through the ME 1204. In this solution, the application ID (e.g., unique ID) identifying the authentication application 1210 identifies an authentication application installed in the UICC 1206. The authenticate command sent from the ME 1204 to the USIM 1208 may be extended in order to provide the USIM/UICC 1206 with the application ID identifying the authentication application 1210. Table 18 below illustrates an example GSM/3G security context identifying the authentication application.

TABLE 18

| Byte(s) | Description | Length |
|---|---|---|
| 1 | Length of RAND (L1) | 1 |
| 2 to (L1 + 1) | RAND | L1 |
| (L1 + 2) | Length of AUTN (L2)(see note) | 1 |
| (L1 + 3) to (L1 + L2 + 2) | AUTN(see note) | L2 |
| (L1 + 3 + 17) to (L1 + L2 + 2 + 17) | CSG Authentication Application Id | 17 |

Note 1:
Parameter present if and only if in 3G security context.
Note 2:
CSG Authentication Application Id only present when supported by the ME and the network.

If the UICC/USIM 1206 is unable to map the authentication application ID to an authentication application, the UICC/USIM 1206 transmits, to the ME 1204, an Unknown Authentication Application Identifier Response parameter. In some instances, the UICC/USIM 1206 may include the Authentication Application ID as part of the response. The ME 1204 may send the same reject message described in regards to Table 16 and 17 upon receiving this indication from the UICC/USIM 1206. Table 19 below illustrates an example GSM/3G security context indicating the authentication application is unknown.

TABLE 19

| Byte(s) | Description | Length |
|---|---|---|
| 1 | "Unknown Authentication Application Identifier" tag = 'XX' | 1 |
| 17 | Unknown Authentication Application Identifier | 17 |

Figure 13:
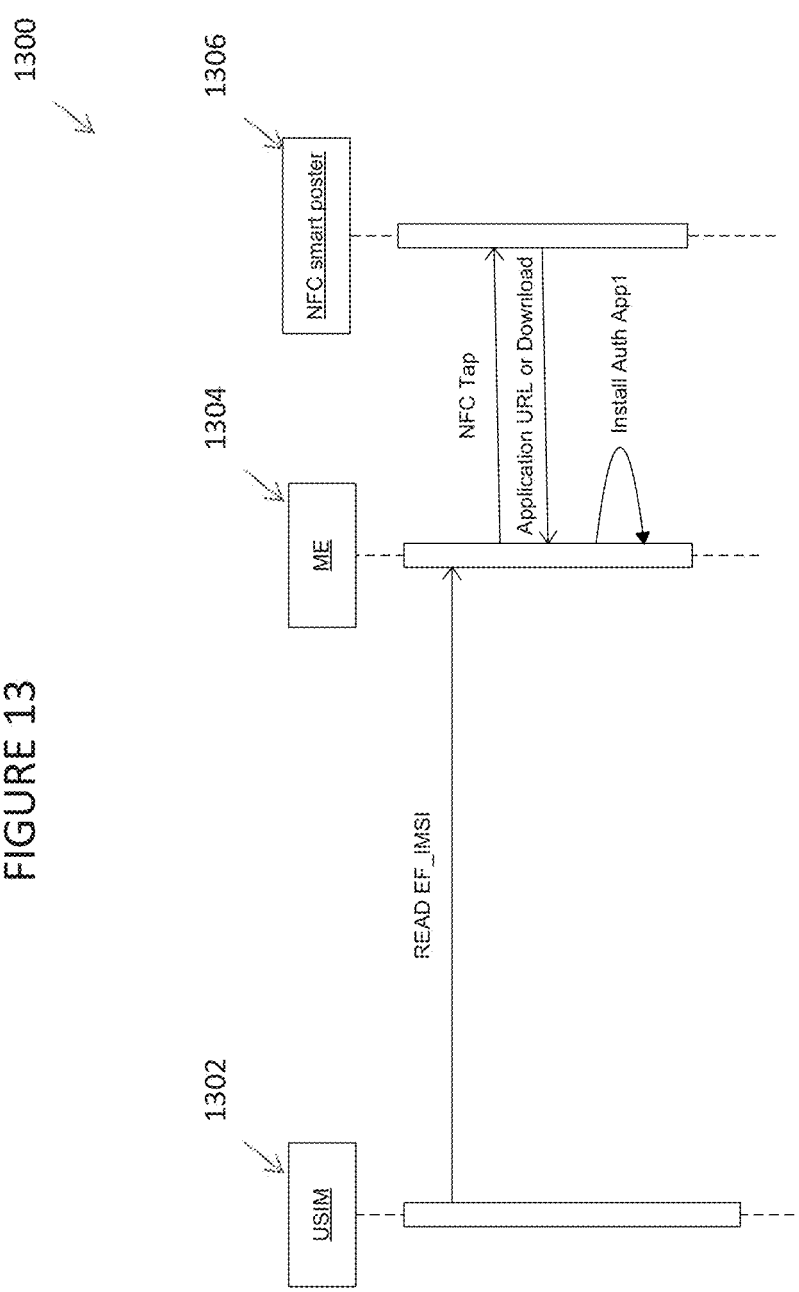
FIG. 13 is a call flow illustrating installing an authentication application using an NFC smart poster.
Figure 14:
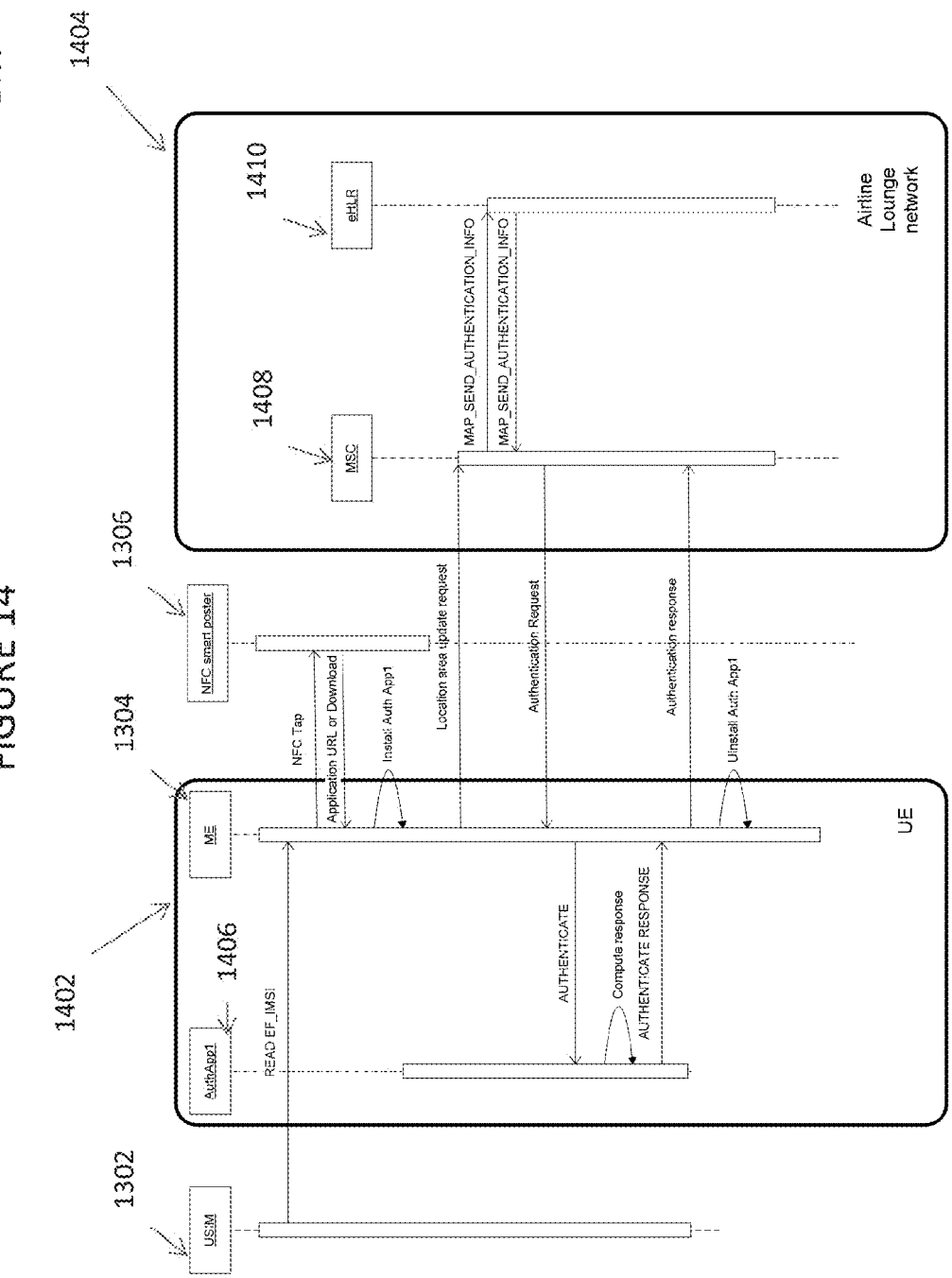
FIG. 14 is a call flow illustrating an ME authenticating with an airline lounge network.

FIGS. 13 and 14 are call flows 1300 and 1400 are directed to using disposable authentication applications. Referring to FIG. 13, the call flow 1300 illustrates installing an authentication application using an NFC smart poster. As illustrated, USIM 1302 transmits the IMSI to ME 1304, which communicates the IMSI to NFC smart poster 1306. For example, a user may tap the ME 1304 to the NFC smart poster 1306 to initiate wireless communication. In response, the NFC smart poster 1306 may communicate an application URL or download the authentication application directly to the ME 1304. In either case, the ME 1304 installs the authentication application in memory. In some implementations, the ME 1304 may attach to a VPLMN (e.g., airline lounge VPLMN) using a "one-time use" authentication application. In these instances, the user may install the authentication application using NFC. For example, the NFC smart poster 1306 may be located inside an airport lounge and transmit invitations to use their local low cost network by tapping the ME 1304 onto the NFC logo.

Referring to FIG. 14, the call flow 1400 illustrates an ME authenticating with an airline lounge network. As illustrated, UE 1402 executes an authentication procedure with network 1404. The UE 1402 includes authentication application 1406, and the network 1404 includes MSC 1408 and HLR 1410. The ME 1304 may transmit a location update request to the MSC 1408, which requests authentication information for the UE 1402 from the HLR 1410. The MSC 1408 generates an authentication request based on the received authentication information and transmits the authentication request to the ME 1304. The ME 1304 identifies the authentication application 1406 for the authentication computation based on the authentication request and passes the authentication request to the authentication application 1406. The authentication application 1406 generates a response based on the request and transmits the response to the MSC 1408. In some implementations, the UE 1402 executes a one-time authentication to the VPLMN 1404 using the authentication application 1406 because the authentication application 1406 takes precedence over the authentication application installed in the USIM/UICC 1302. Once the authentication procedure is completed, the ME 1304 uninstalls or discards or disables the authentication application 1406. After authentication, the ME 1304 may access network services until the user leaves the lounge. In this implementation, the authentication application 1406 may reside in either ME memory or the USIM/UICC 1302.

In some implementations, the ME 1304 may return to using the authentication application in the USIM/UICC 1302 after uninstalling the authentication application 1406. For example, after the user leaves the lounge, the ME 1304 may continue with normal HPLMN controlled operation because no more authentication applications take precedence over the authentication application installed in the USIM/UICC 1302. Additionally, in these implementations, the network may not explicitly identify the application ID because the authentication application 1406 only functions on a temporary basis. The ME 1304 may always revert back to the authentication application installed in the USIM/UICC 1302 if authentication fails. Though, an application ID may be used and formatted as discussed above.

Figure 15:
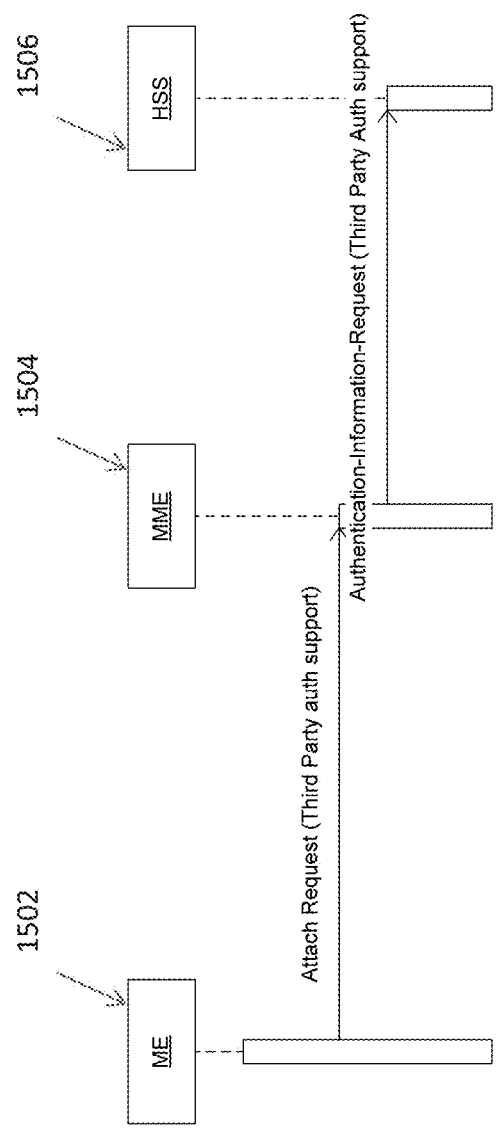
FIG. 15 is a call flow illustrating a UE indicating to a network support of third-party authentication.

FIGS. 15-18 are call flow diagrams 1500-1800 illustrating example methods for third-party authentication computation. Referring to FIG. 15, the call flow 1500 is directed to a UE indicating to a network support of third-party authentication. As illustrated, ME 1502 transmits, to MME 1504, an attach request indicating support of third-party authentication. In response to the request, the MME 1504 transmits, to HSS 1506, an authentication-information request indicating ME 1502 supports third-party authentication. In some implementations, the ME 1502 may indicate support to the network when attaching or registering with a VPLMN. During an Attach or a Tracking Area Updating procedure, the ME 1502 can indicate to the VPLMN support of third-party authentication. The ME 1502 can include this indication in a classmark that is included an ATTACH REQUEST or TRACKING AREA UPDATE REQUEST. Table 20 below illustrates an example mobile station classmark 2 for indicating third-party authentication support.

TABLE 20

Mobile Station Classmark 2

| 8 | 7 | 6 | 5 | 4 | 3 | 2 | 1 | |
|---|---|---|---|---|---|---|---|---|
| Mobile station classmark 2 IEI | | | | | | | | octet 1 |
| Length of mobile station classmark 2 contents | | | | | | | | octet 2 |
| Third Party authentication support | Revision level | | ES IND | A5/1 | RF power Capability | | | octet 3 |
| 0 spare | PS capa. | SS Screen. Indicator | | SM ca pabi. | VBS | VGCS | FC | octet 4 |
| CM3 | 0 spare | LCSVA CAP | UCS2 | SoLSA | CMSP | A5/3 | A5/2 | octet 5 |

Owing to backward compatibility problems, bit 8 of octet 4 may not be used unless it is also checked that the bits 8, 7 and 6 of octet 3 are not "0 0 0". When the MME 1504 determines ME supports third party authentication, the HSS 1506 may be informed by adding an indicator to the Supported-Features AVP in the Authentication-Information-Request command. The indicator could also be sent in the Update-Location-Request message.

The Authentication-Information-Request (AIR) command, indicated by the Command-Code field set to 318 and the 'R' bit set in the Command Flags field, may be sent from the MME 1504 or SGSN to the HSS 1506. An example message format is indicated below:

```
< Authentication-Information-Request> ::=    < Diameter Header: 318,
REQ, PXY, 16777251 >
              < Session-Id >
              [ Vendor-Specific-Application-Id ]
              { Auth-Session-State }
              { Origin-Host }
              { Origin-Realm }
              [ Destination-Host ]
              { Destination-Realm }
              { User-Name }
              *[Supported-Features]
              [ Requested-EUTRAN-Authentication-Info ]
              [ Requested-UTRAN-GERAN-Authentication-Info ]
              { Visited-PLMN-Id }
              [Third-Party-Authentication-Support-Indicator]
              *[ AVP ]
              *[ Proxy-Info ]
              *[ Route-Record ]
```

The Third-Party-Authentication-Support-Indicator AVP is of type Enumerated. The following values are defined: THIRD_PARTY_AUTHENTICATION_NOT_SUPPORTED_BY_UE (0); and THIRD_PARTY_AUTHENTICATION_SUPPORTED_BY_UE (1). Table 21 illustrated an example S6a/S6d and S13/S13' specific Diameter AVPs, and Table 22 illustrates an example Authentication Information Request.

TABLE 21

| | | | | AVP Flag rules | | | | |
|---|---|---|---|---|---|---|---|---|
| Attribute Name | AVP Code | Section defined | Value Type | Must | May | Should not | Must not | May Encr. |
| Third-Party-Authentication-Support-Indicator | ZZZZ | 7.3.X | Enumerated | | O, V | | | No |

TABLE 22

| Information element name | Mapping to Diameter AVP | Cat. | Description |
|---|---|---|---|
| IMSI | User-Name (See IETF RFC 3588 [4]) | M | This information element shall contain the user IMSI, formatted according to 3GPP TS 23.003 [3], clause 2.2. |
| Supported Features (See 3GPP TS 29.229 [9]) | Supported-Features | O | If present, this information element shall contain the list of features supported by the origin host. |

TABLE 22-continued

| Information element name | Mapping to Diameter AVP | Cat. | Description |
|---|---|---|---|
| Requested E-UTRAN Authentication Info (See 7.3.11) | Requested-EUTRAN-Authentication-Info | C | This information element shall contain the information related to authentication requests for E-UTRAN. |
| Requested UTRAN/GERAN Authentication Info (See 7.3.12) | Requested-UTRAN-GERAN Authentication-Info | C | This information element shall contain the information related to authentication requests for UTRAN or GERAN. |
| Visited PLMN ID (See 7.3.9) | Visited-PLMN-ID | M | This IE shall contain the MCC and the MNC of the visited PLMN, see 3GPP TS 23.003 [3]. |
| Third-Party-Authentication-Support-Indicator (See 7.3.X) | Third-Party-Authentication-Support-Indicator | O | If present, this IE shall indicate if the UE supports Third Party Authentication. |

Figure 16:
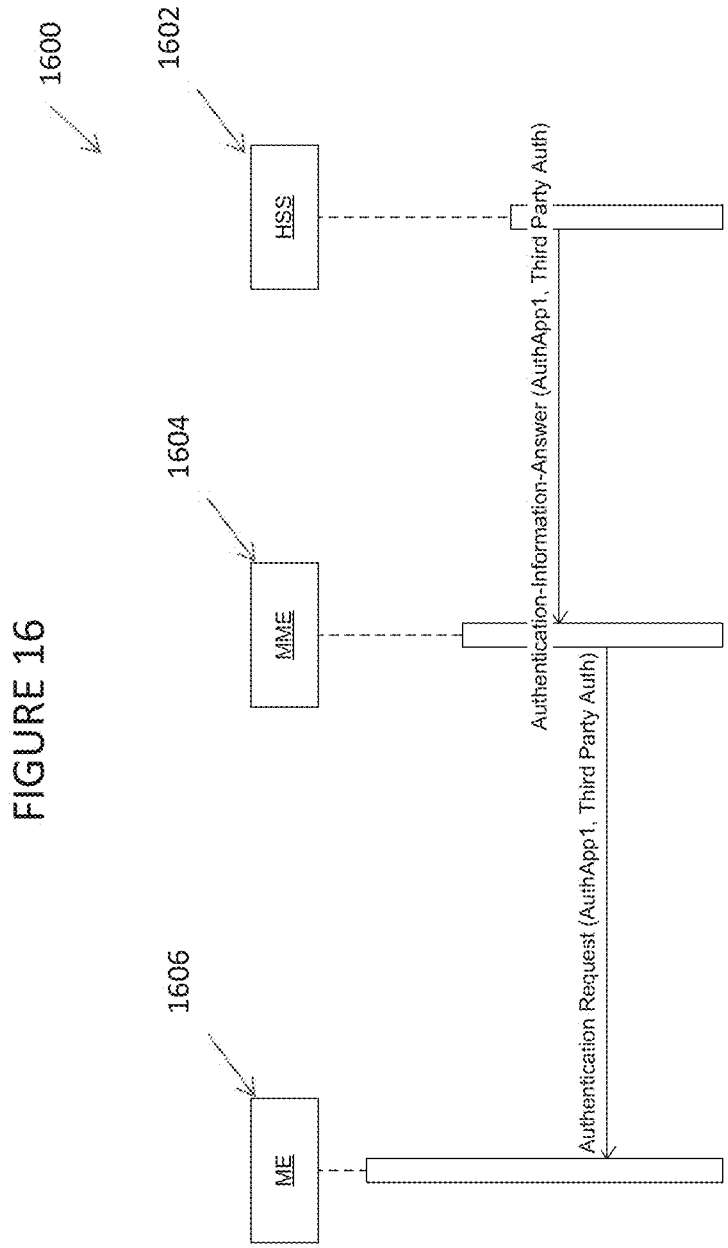
FIG. 16 is a call flow illustrating a VPLMN indicating to the ME what authentication application to execute.

Referring FIG. 16, the call flow 1600 is directed to a VPLMN indicating to the ME what authentication application to execute. In the illustrated implementation, HSS 1602 transmits, to MME 1604, an authentication-information answer identifying an authentication application executed by a third-party device. The MME 1604 transmits, to ME 1606, an authentication request identifying an authentication application executed by a third-party device. In other words, the VPLMN may send an application ID identifying an authentication application, in this example AuthApp1, to the ME 1606. The presence of the application ID may imply support of the associated authentication computation. In some implementations, the application ID may also be accompanied by an indication that the VPLMN supports third-party authentication. This indication may be present in the broadcast system information or in the authentication-information-answer commands or authentication request messages. The HSS 1602 may communicate, to the MME 1606, the application ID using an authentication-information-answer command that is extended with a third party authentication application ID. In some implementations, the HSS 1602 may communicate the application ID in other messages such as the Update-Location-Answer command.

The Authentication-Information-Answer (AIA) command, indicated by the Command-Code field set to 318 and the 'R' bit cleared in the Command Flags field, may be sent from the HSS 1602 to the MME 1604 or SGSN. An example format of the command is indicated below:

```
< Authentication-Information-Answer> ::= < Diameter Header: 318,
PXY, 16777251 >
        < Session-Id >
        [ Vendor-Specific-Application-Id ]
        [ Result-Code ]
        [ Experimental-Result ]
        [ Error-Diagnostic ]
        { Auth-Session-State }
        { Origin-Host }
        { Origin-Realm }
        * [Supported-Features]
        [Authentication-Info ]
        [Authentication-Application-Id]
        [Third-Party-Authentication-Application-Indicator]
        *[ AVP ]
        *[ Failed-AVP ]
        *[ Proxy-Info ]
        *[ Route-Record ]
```

The Third-Party-Authentication-Application-Indicator AVP may be of type Enumerated. This AVP may indicate whether the authentication application is a third party authentication application. If this parameter is not present, the UE may use the default USIM authentication application. The following values are defined: THIRD_PARTY_AUTHENTICATION_NOT_SUPPORTED_BY_UE (0); and THIRD_PARTY_AUTHENTICATION_SUPPORTED_BY_UE (1). Table 23 illustrates an example S6a/S6d and S13/S13' specific Diameter AVPs, and Table 24 illustrates an example Authentication Information Answer.

TABLE 23

| | | | | AVP Flag rules | | | | |
|---|---|---|---|---|---|---|---|---|
| Attribute Name | AVP Code | Section defined | Value Type | Must | May | Should not | Must not | May Encr. |
| Third-Party-Authentication-Application-Indicator | BBB | 7.3.Z | Enumerated | O, V | | | | No |

TABLE 24

| Information element name | Mapping to Diameter AVP | Cat. | Description |
|---|---|---|---|
| Result (See 7.4) | Result-Code/ Experimental- Result | M | This IE shall contain the result of the operation. This IE shall contain the Result-Code AVP shall be used to indicate success/errors as defined in the Diameter Base Protocol. The Experimental-Result AVP shall be used for S6a/S6d errors. This is a grouped AVP which shall contain the 3GPP Vendor ID in the Vendor-Id AVP, and the error code in the Experimental-Result- Code AVP. The following errors are applicable in this case: User Unknown Unknown EPS Subscription |
| Error- Diagnostic | Error- Diagnostic | O | If the Experimental Result indicated "Unknown EPS Subscription", Error Diagnostic may be present to indicate whether or not GPRS subscription data are subscribed (i.e. whether or not Network Access Mode stored in the HSS indicates that only circuit service is allowed). |
| Supported Features (See 3GPP TS 29.229 [9]) | Supported- Features | O | If present, this information element shall contain the list of features supported by the origin host. |
| Authentication Info (See 7.3.17) | Authentication- Info | C | This IE shall contain the Authentication Vectors. |
| Third- Party- Authentication- Application- Indicator | Third-Party- Authentication- Application- Indicator | O | If this IE is present the UE shall use a Third party Authentication Application to compute its authentication response. |

The MME 1604 may convey the authentication application ID to the UE using the authenticate command extended with the authentication application ID information element. When a NAS signaling connection exists, the network may initiate an authentication procedure at any time, with a few restrictions after handover or inter-system handover to Si mode. The network may initiate the authentication procedure by sending an AUTHENTICATION REQUEST message to the UE and start the timer T3460. The AUTHENTICATION REQUEST message may contain parameters used to calculate the authentication response. Optionally, in the case of authentication of a third party authentication capable network, the network may include an authentication application ID as part of the authentication request message. The network may also indicate whether to use an external entity or third party to compute the response using the third party authentication indication. Table 25 illustrates an example authentication request sent by the network to initiate authentication of the UE identity.

The authentication application ID information element identifies, to the UE, the authentication application to use to calculate the authentication response. The Authentication response parameter information element is coded as shown in Tables 25 and 26. In particular, table 25 illustrates an example Authentication Application information element, and table 26 illustrates an example Authentication Parameter RAND information element.

TABLE 25

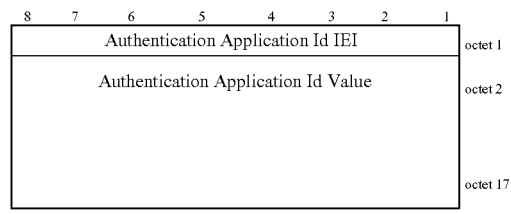

TABLE 25

| IEI | Information element | Type/Reference | Presence | Format | Length |
|---|---|---|---|---|---|
| | Protocol discriminator | Protocol discriminator | M | V | ½ |
| | Security header type | Security header type | M | V | ½ |
| | Authentication request message type | Message type | M | V | 1 |
| | NAS key set identifier$_{ASME}$ | NAS key set identifier | M | V | ½ |
| | Spare half octet | Spare half octet | M | V | ½ |
| | Authentication parameter RAND (EPS challenge) | Authentication parameter RAND | M | V | 16 |
| | Authentication parameter AUTN (EPS challenge) | Authentication parameter AUTN | M | LV | 17 |
| | Authentication Application Id | Authentication Application Id | O | V | 17 |
| | Third Party authentication Indication | Third Party authentication Indication | O | V | ⅛ |

TABLE 26

Authentication Application Id

The Authentication response parameter may be a type 4 information element with a minimum length of 6 octets and a maximum length of 18 octets. In an EPS authentication challenge, the application identified by the Authentication Application Id calculates the response. This indicator may inform the UE that the authentication computation will be executed by a third party or an external entity.

Figure 17:
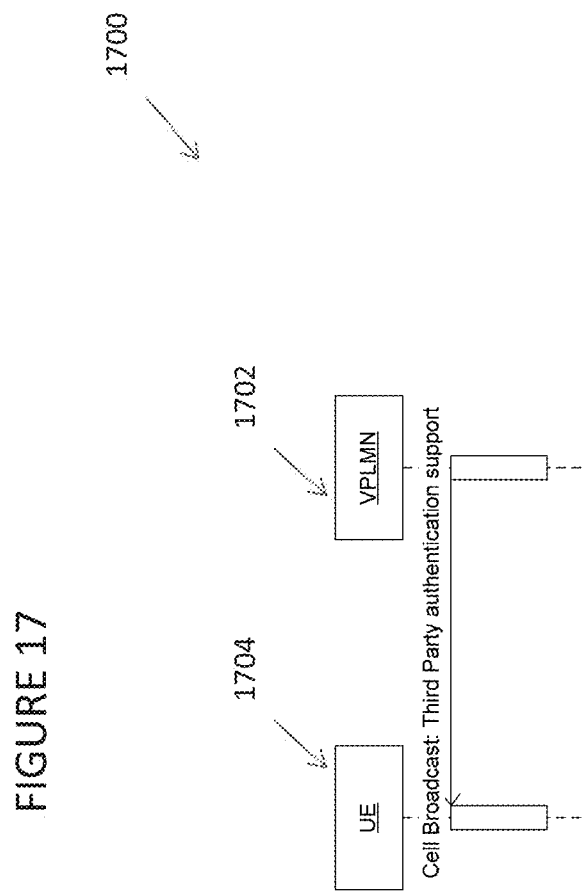
FIG. 17 is a call flow illustrating a broadcast message indicating support of third-party authentication.

Referring to FIG. 17, the call flow 1700 is directed to a broadcast message indicating support of third-party authentication. As illustrated, VPLMN 1702 transmits, to UE 1704, a cell broadcast indicating support of third-party authentication. In other words, the VPLMN 1702 may transmit information indicating support for third party authentication using a broadcast channel. Broadcasting the support may enable the ME 1704 to provide a quick indication to the user that further action may be required in order to access the VPLMN 1702.

Figure 18:
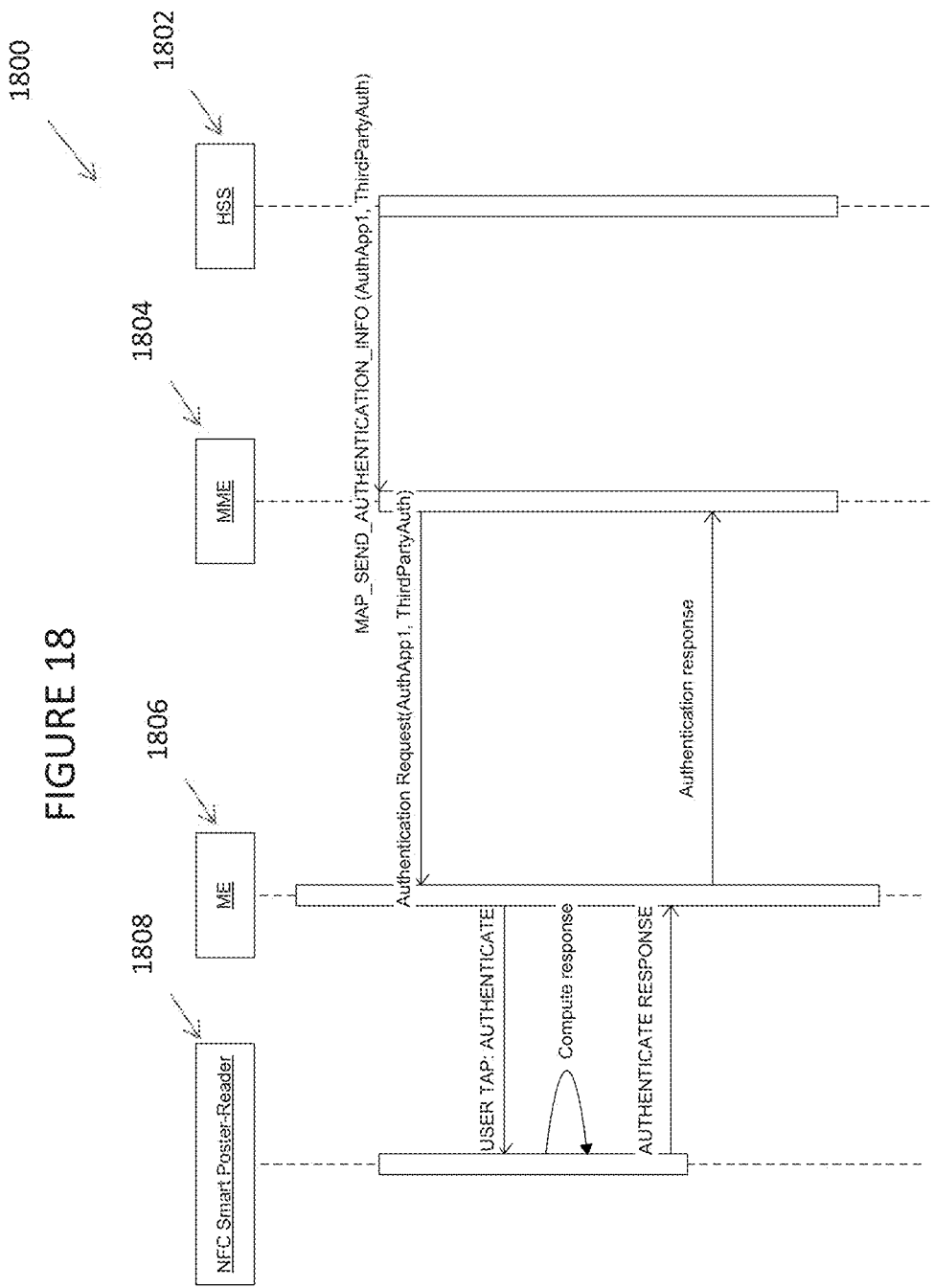
FIG. 18 is a call flow illustrating an ME informing the user to tap an NFC reader to gain access to a network.

Referring to FIG. 18, the call flow 1800 is directed to an ME informing the user to tap an NFC reader to gain access to a network. HSS 1802 transmits, to MME 1804, a MAP_SEND_AUTHENTICATION_INFO message including information identifying a third-party device and authentication application for executing the authentication computation. In response, the MME 1804 transmits, to ME 1806, an authentication request including information identifying a third-party device and authentication application for executing the authentication computation. In response to the request, the ME 1806 indicates, to the user, to tap a specified third-party device 1808. In connection with communicating with the NFC smart poster reader 1808, the ME 1806 transmits authentication parameters to the reader 1808, which generates an authentication response using the authentication parameters and identified authentication application. For example, upon receiving the authentication request message from the VPLMN, the ME 1806 reads the Authentication Application Id and Third Party authentication indication values included in the Authentication Request message. In addition, the ME 1806 notifies the user to locate the NFC reader 1808 to compute the authentication response. In some implementations, the ME 1806 may relay the Authentication Application ID and Third Party authentication values to the USIM/UICC. The USIM/UICC may then inform the user to locate the NFC reader to compute the authentication response using USIM Application Toolkit commands or Smart Card Web Server. The user may tap the ME 1806 on the NFC reader 1808 to enable the ME 1806 to transmit over the NFC connection the authentication parameters (e.g., NAS key set, RAND, AUTH). The NFC reader 1808 may compute (or have a back-end server or HSS compute) the response parameters (SRES or RES) and transmit the response to the ME 1806. The ME 1806 may transmit the received SRES or RES value to the VPLMN.

Figure 19:
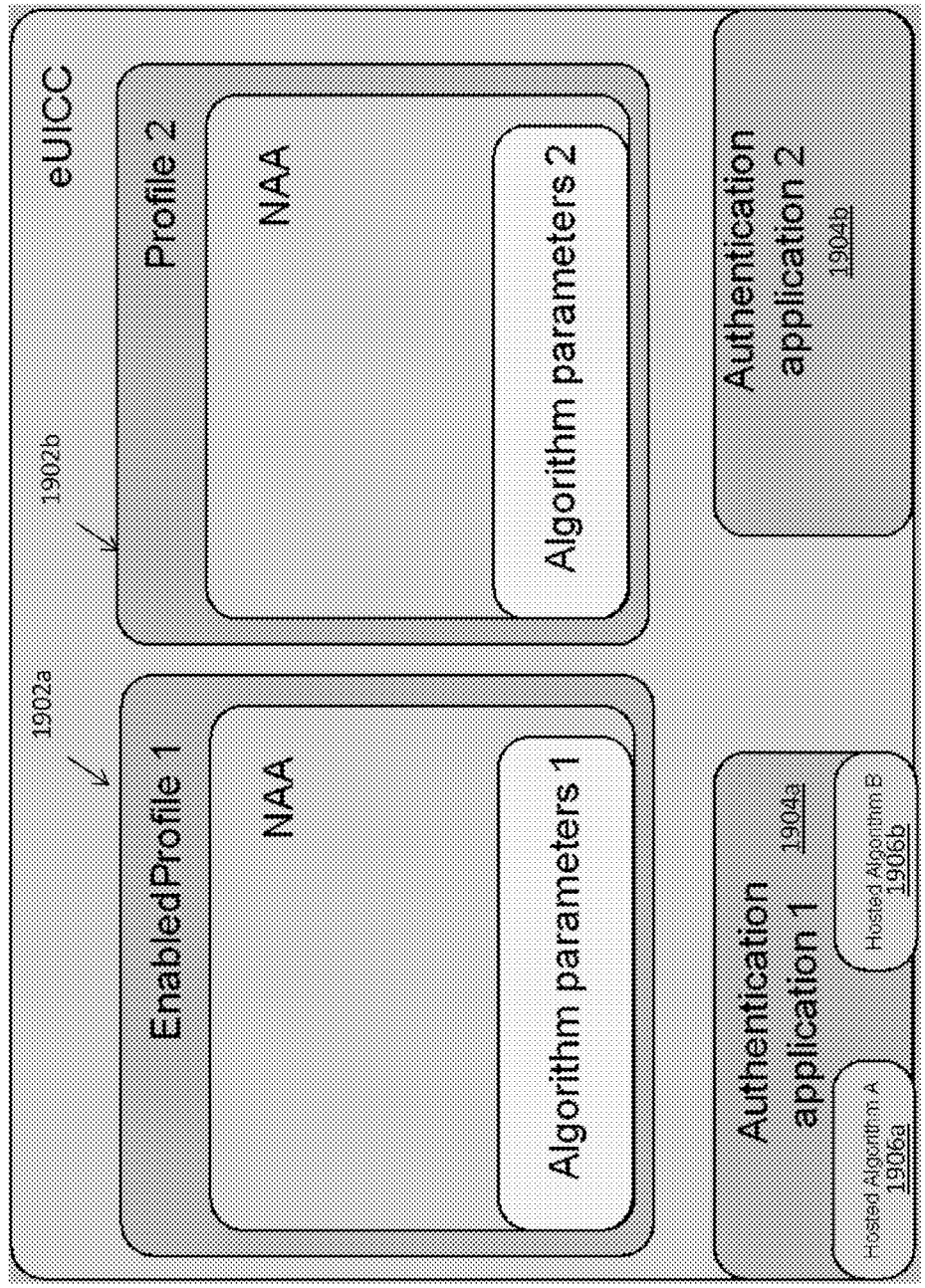
FIG. 19 is an example UICC including multiple profiles and multiple authentication applications.
Figure 20:
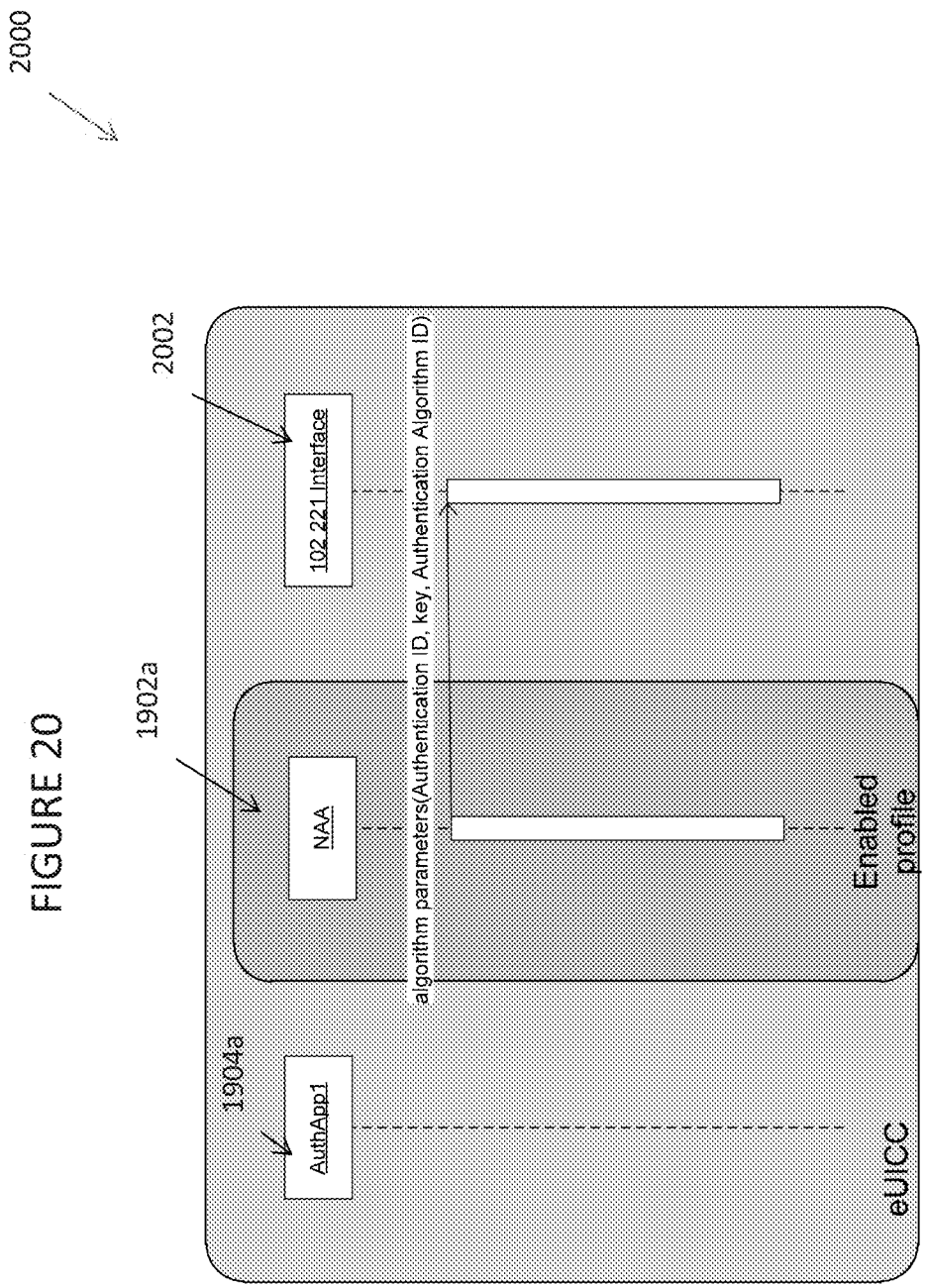
FIG. 20 is a call flow illustrating an UICC determining which authentication application to execute.
Figure 21:
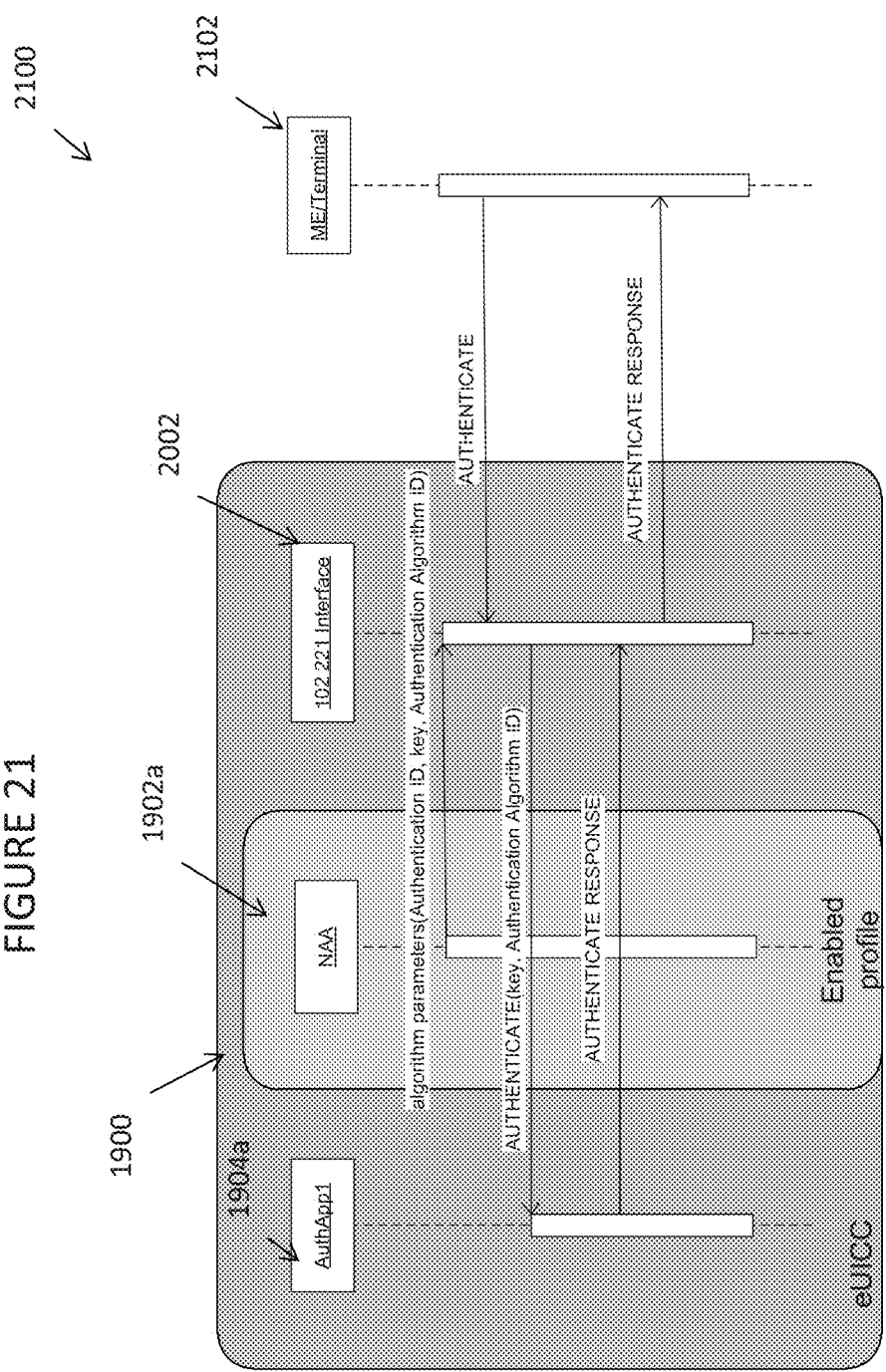
FIG. 21 is a call flow illustrating a UICC sending an AUTHENTICATE command to an appropriate authentication application.

FIGS. 19-21 illustrate an example eUICC 1900 and call flows 2000 and 2100 directed to addressing multiple authentication applications hosted by a eUICC. Referring to FIG. 19, the illustrated eUICC 1900 includes multiple profiles 1902a and 1902b and multiple authentication applications 1904a and 1904b. In some implementations, the authentication application 1904a can host multiple algorithms 1906a and 1906b for network authentication. Even though the eUICC 1900 has two profiles 1902a and 1902b, only profile 1902a is enabled. Also, the eUICC 1900 has two authentication applications 1904a and 1904b, and the authentication application 1904a hosts algorithm 1906a and algorithm 1906b. In general, the eUICCs, including the eUICC 1900, or UICCs may include only legacy authentication applications, only third-party authentication applications, both legacy and third-party authentication, or authentication applications without departing form the scope of this disclosure.

Referring to FIG. 20, the call flow 2000 is directed at the eUICC 1900 determining which authentication application 1904 to execute. When the profile 1902a is enabled, the eUICC 1900 reads the algorithm parameters from the NAA(s) included in that profile 1902a. In some implementations, these parameters may be included with the profile and not be a part of an NAA. The algorithm parameters may include an authentication application ID, a shared secret (e.g., a symmetric key), and an algorithm identifier. In the illustrated implementation, the ETSI TS 102 221 interface 2002 is responsible for reading or otherwise obtaining these parameters. In some implementations, when the profile 1902a is enabled, the eUICC (or the 102 221 interface) can automatically launch the application 1904a associated with the authentication ID and execute the authentication computation using the authentication parameters. When the profile 1902a is disabled, the UICC may close the application 1904a.

Referring to FIG. 21, the call flow 2100 is directed to the eUICC 1900 sending the AUTHENTICATE command to the appropriate authentication application 1904. The ME 2202 sends an AUTHENTICATE command to the UICC 1900. In the illustrated implementation, the 102 221 interface 2002 redirects the AUTHENTICATE command along with the shared secret (symmetric key) and the algorithm ID to the authentication application 1904. The AUTHENTICATE command sent from the ME 2102 to the UICC 1900 may be extended to include the authentication application ID, the key, and algorithm ID, which the associated authentication algorithm 906 to use during the authentication computation. Table 27 illustrates an example GSM/3G security context for identifying an authentication algorithm 1906.

TABLE 27

| Byte(s) | Description | Length |
| --- | --- | --- |
| 1 | Length of RAND (L1) | 1 |
| 2 to (L1 + 1) | RAND | L1 |
| (L1 + 2) | Length of AUTN (L2)(see note) | 1 |
| (L1 + 3) to (L1 + L2 + 2) | AUTN(see note) | L2 |
| (L1 + 3 + 10) to (L1 + L2 + 2 + 10) | Symmetric key | 10 |
| (L1 + 3 + 10 + 3) to (L1 + L2 + 2 + 10 + 3) | Authentication Algorithm ID | 3 |

Note:
Parameter present if and only if in 3G security context.

In some implementations, the AUTHENTICATE command may be sent to the authentication application 1904a unchanged from the AUTHENTICATE command received from the ME 2202. The authentication application 1904a computes the response and sends that response to the 102 221 interface 2002, which transmits the response to the ME 2102. In some implementations, the response can be sent directly to the ME.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
transmitting, by the mobile UE, application information identifying the mobile UE's supported authentication applications to a visited public land mobile network (VPLMN);
receiving, by mobile user equipment (UE) including a Subscriber Identity Module (SIM), an authentication request from the VPLMN, the request identifying authentication parameters and an authentication application assigned to a home public land mobile network (HPLMN) and stored in a specified third-party device wirelessly coupled to the mobile UE;
executing, by the mobile UE, the authentication application based on the authentication parameters to determine an authentication response, wherein executing the authentication application includes wirelessly communicating with the specified third-party device to provide the authentication parameters and receive the authentication response; and
transmitting, by the mobile UE, the authentication response to the VPLMN.

2. The method of claim 1, further comprising transmitting, to the PLMN, application information identifying an application identifier (ID) identifying the third-party authentication application installed in a memory of the UE.

3. The method of claim 2, wherein the application information identifies a plurality of application IDs including the application ID.

4. The method of claim 2, wherein the application ID identifies a mobile country code (MCC) and a mobile network code (MNC) assigned to a VPLMN.

5. The method of claim 1, further comprising obtaining the third-party authentication application from a near field communication (NFC) smart poster.

6. The method of claim 5, further comprising uninstalling the third-party authentication application after expiration of a specified time period or after a specified number of executions of the third-party authentication application.

7. The method of claim 1, wherein executing the third-party authentication application comprises:
receiving an indication to communicate with a specified third-party device.

8. The method of claim 7, wherein the specified third-party device comprises one of a NFC reader, a NFC smart poster, an USB dongle, and a security dongle.

9. Mobile User equipment (UE), comprising:
a Subscriber Identity Module (SIM) configured to store a SIM authentication application; and
one or more processors configured to:
transmit, by the mobile UE, application information identifying the mobile UE's supported authentication applications to a visited public land mobile network (VPLMN);
receive, by the mobile UE an authentication request from the VPLMN, the request identifying authentication parameters and an authentication application assigned to a home public land mobile network (HPLMN) and stored in a specified third-party device wirelessly coupled to the mobile UE;
execute, by the mobile UE, the authentication application based on the authentication parameters to determine an authentication response, wherein executing the authentication application includes wirelessly communicating with the specified third-party device to provide the authentication parameters and receive the authentication response; and
transmit, by the mobile UE, the authentication response to the VPLMN.

10. The user equipment of claim 9, the processors further configured to transmit, to the PLMN, application information identifying an application identifier (ID) identifying the third-party authentication application installed in a memory of the UE.

11. The user equipment of claim 10, wherein the application information identifies a plurality of application IDs including the application ID.

12. The user equipment of claim 10, wherein the application ID identifies a mobile country code (MCC) and a mobile network code (MNC) assigned to a VPLMN.

13. The user equipment of claim 9, the processors further configured to obtain the third-party authentication application from a near field communication (NFC) smart poster.

14. The user equipment of claim 13, the processors further configured to uninstall the third-party authentication application after expiration of a specified time period or after a specified number of executions of the third-party authentication application.

15. The user equipment of claim 9, wherein the processors configured to execute the third-party authentication application:
receive an indication to communicate with a specified third-party device.

16. The user equipment of claim 15, wherein the specified third-party device comprises one of a NFC reader, a NFC smart poster, an USB dongle, and a security dongle.

* * * * *